US007248960B2

(12) United States Patent
Ikemoto et al.

(10) Patent No.: US 7,248,960 B2
(45) Date of Patent: Jul. 24, 2007

(54) AIR-FUEL RATIO SENSOR MONITOR, AIR-FUEL RATIO DETECTOR, AND AIR-FUEL RATIO CONTROL

(75) Inventors: Noriaki Ikemoto, Oobu (JP); Naoki Yoshiume, Takahama (JP); Yukihiro Yamashita, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/520,812

(22) Filed: Sep. 14, 2006

(65) Prior Publication Data

US 2007/0012086 A1 Jan. 18, 2007

Related U.S. Application Data

(62) Division of application No. 10/938,815, filed on Sep. 13, 2004.

(30) Foreign Application Priority Data

Sep. 11, 2003 (JP) ............................ 2003-319986
Sep. 24, 2003 (JP) ............................ 2003-331172
Sep. 24, 2003 (JP) ............................ 2003-331173
Dec. 9, 2003 (JP) ............................ 2003-410005

(51) Int. Cl.
*G06G 7/70* (2006.01)
*G06F 19/00* (2006.01)
*G01M 15/04* (2006.01)

(52) U.S. Cl. ........................ 701/114; 123/690; 60/285; 73/118.1

(58) Field of Classification Search ................ 701/103, 701/107, 109, 114; 123/674, 679, 688, 690; 60/274, 276, 285; 73/1.06, 1.07, 233.1, 233.2, 73/118.1; 204/401; 702/58, 116, 185
See application file for complete search history.

(56) References Cited

U.S. PATENT DOCUMENTS 5,119,629 A 6/1992 Kume et al. .................. 60/274
5,212,947 A 5/1993 Fujimoto et al. ............. 60/276
5,454,259 A 10/1995 Ishii et al. ................. 73/118.1
5,634,454 A 6/1997 Fujita ......................... 123/690
5,758,632 A 6/1998 Yamashita et al. .......... 123/688
5,964,208 A 10/1999 Yamashita et al. .......... 123/674
6,032,659 A 3/2000 Yamashita et al. .......... 123/674
6,718,252 B2 4/2004 Kawai et al. ............... 701/104
6,920,751 B2 7/2005 Yasui et al. .................... 60/277

FOREIGN PATENT DOCUMENTS

JP 2-11841 1/1990
JP 2-67443 3/1990
JP 4-237851 8/1992
JP 10-169501 6/1998
JP 2002-130020 5/2002

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

An air-fuel ratio sensor monitor is provided which is designed to monitor reactive characteristics or response rates of an air-fuel ratio sensor when an air-fuel ratio of a mixture to an internal combustion engine is changing to a rich side and to a lean side. The monitored response rates are used in determining whether the sensor is failing or not, in determining the air-fuel ratio of the mixture accurately, or in air-fuel ratio control of the engine.

49 Claims, 25 Drawing Sheets

AIR-FUEL RATIO SENSOR MONITOR, AIR-FUEL RATIO DETECTOR, AND AIR-FUEL RATIO CONTROL

This application is a Divisional of U.S. application Ser. No. 10/938,815, filed Sep. 13, 2004, allowed, which claims priority to JP Application No. JP 2003-319986, filed Sep. 11, 2003; JP 2003-331173, filed Sep. 24, 2003; JP 2003-331172, filed Sep. 24, 2003; and JP 2003-410005, filed Dec. 9, 2003. The entire contents of these applications are incorporated herein by reference.

BACKGROUND OF THE INVENTION

1. Technical Field of the Invention

The present invention relates generally to a air-fuel ratio sensor monitor designed to monitor response characteristics of an air-fuel ratio sensor for internal combustion engines and a failure in operation of the air-fuel ratio sensor, an air-fuel ratio detector designed to detect an air-fuel ratio of a mixture to the engine using an air-fuel ratio sensor, and an air-fuel ratio control designed to control an air-fuel ratio of a mixture to the engine using an air-fuel ratio sensor.

2. Background Art

Air-fuel ratio detecting devices have already been put into practical use which have an air-fuel ratio sensor (e.g., an exhaust gas oxygen sensor) installed in an exhaust pipe of an internal combustion engine which produces an indication of an instantaneous air-fuel ratio that is being used by the engine. In recent years, as such a type of air-fuel ratio sensor, linear air-fuel ratio sensors have been employed which produce an output changing linearly with the instantaneous air-fuel ratio. Air-fuel ratio control systems using such an air-fuel ratio detecting device work to bring an air-fuel ratio, as measured by the air-fuel ratio sensor, into agreement with a target one under feedback control, thereby improving exhaust emissions of the engine.

It is important for the air-fuel ratio feedback control to ensure the stability of operation of the air-fuel ratio sensor at all times. For instance, Japanese Patent First Publication No. 4-237851 teaches diagnosing the deterioration of the air-fuel ratio sensor using a sensor response rate when an air-fuel ratio feedback gain is changed around the stoichiometric air-fuel ratio. U.S. Pat. No. 5,964,208, assigned to the same assignee as that of this application, discloses an air-fuel ratio control system which determines a rate of change in air-fuel ratio, as detected by an air-fuel ratio sensor, and a rate of change in air-fuel ratio correction factor and compares them to diagnose the sensor.

The most common type of air-fuel ratio sensor is an oxygen sensor made up of a zirconia solid electrolyte body with two electrodes affixed thereto. The oxygen sensor works to ionize oxygen molecules contained in exhaust gas of the engine and measure the amount of oxygen ions moving between the electrodes as representing the concentration of oxygen in the exhaust gas which depends upon an instantaneous air-fuel ratio of a mixture to the engine. However, such a type of oxygen sensor may have a difference between response rates when the air-fuel ratio changes to a rich side and to a lean side due to original reactive errors or aging of the sensor. This results in a difficulty in diagnosing the sensor accurately if the response rate of the sensor drops undesirably only at either one of rich and lean mixtures.

U.S. Pat. No. 5,119,629 discloses an air-fuel ratio feedback controls system using the above type of air-fuel ratio sensor in order to improve emission control efficiency of a catalytic converter. Such a feedback control system, however, has a problem that the accuracy of determining the air-fuel ratio decreases due to the above described response rate difference of the air-fuel ratio sensor between rich and lean mixtures.

Japanese Patent First Publication No. 2-67443 teaches an air-fuel ratio control system which has a linear air-fuel (A/F) ratio sensor installed upstream of a three-way catalytic converter and a $\lambda O_2$ sensor installed downstream of the converter and monitors an output of the $\lambda O_2$ sensor to correct controlled variables of the linear A/F ratio sensor and air-fuel ratio correction factors. This type of control system also encounters the same problem as described above, thus resulting in a variation in speed at which the air-fuel ratio converges on the stoichiometric air-fuel ratio.

SUMMARY OF THE INVENTION

It is therefore a principal object of the invention to avoid the disadvantages of the prior art.

It is another object of the invention to provide an air-fuel ratio sensor monitor, an air-fuel ratio detector, and an air-fuel ratio control which are designed to compensates for a difference in response rates or characteristics of an air-fuel ratio sensor between rich and lean mixtures to an internal combustion engine.

According to one aspect of the invention, there is provided an air-fuel ratio sensor failure detecting apparatus designed to detect a predetermined failure of an air-fuel ratio sensor installed in an exhaust line of an internal combustion engine. The apparatus comprises: (a) a correction factor determining circuit working to determine an air-fuel ratio correction factor to bring an air-fuel ratio, as detected through the air-fuel ratio sensor, into agreement with a target value; (b) an air-fuel ratio change data determining circuit working to determine air-fuel ratio change data associated with changes in the detected air-fuel ratio to a rich and a lean side, respectively; (c) an air-fuel ratio correction factor change data determining circuit working to determine air-fuel ratio correction factor change data associated with changes in the air-fuel ratio correction factor upon changes in the air-fuel ratio to the rich and lean sides, respectively; (d) a response characteristic determining circuit working to determine response characteristics of the air-fuel ratio sensor upon the changes in the air-fuel ratio to the rich and lean sides, respectively, as functions of the air-fuel ratio change data and the air-fuel ratio correction factor change data; and (e) a sensor failure detecting circuit working to detect the predetermined failure of the air-fuel ratio sensor based on the response characteristics, as determined by the response characteristic determining circuit.

It is found that a change in dynamic characteristics of air-fuel ratio sensors arising from the aging thereof etc. may cause either one of response rates of the sensors at rich and lean mixtures to the engine to change greatly, thus resulting in a failure in operation of the sensors. The sensor failure detecting apparatus of the invention is capable of sensing such a change in the response rates to detect the failure of the sensor accurately.

Note that changes in air-fuel ratio to the rich side and lean side, as referred to below, are substantially identical with changes in an output of the air-fuel ratio sensor or the air-fuel ratio correction factor to the rich and lean sides. Such changes does not always range across the stiochiometric air-fuel ratio, and orientations thereof indicate directions in which the output of the air-fuel ratio sensor or the air-fuel ratio correction factor changes at least one of the rich and lean sides.

In the preferred mode of the invention, the response characteristic determining circuit determines the response characteristics of the air-fuel ratio sensor upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side. The sensor failure detecting circuit detects the predetermined failure of the air-fuel ratio sensor based on the rich side and lean side ratios, as determined by the response characteristic. Specifically, the failure is monitored in a correlation between the air-fuel ratio change data and the air-fuel ratio correction factor change data, thereby improving the reliability of detecting the failure.

The sensor failure detecting circuit may compares the rich side ratio with a given rich side reference value and the lean side ratio with a given lean side reference value to determine whether the predetermined failure of the air-fuel ratio sensor has occurred or not.

The sensor failure detecting circuit may determine that the air-fuel ratio sensor is failing in the response characteristic upon the change in the air-fuel ratio to the rich side when the change in the detected air-fuel ratio to the rich side is greater than the change in the air-fuel ratio correction factor upon the change in the air-fuel ratio to the rich side and that the air-fuel ratio sensor is failing in the response characteristic upon the change in the air-fuel ratio to the lean side when the change in the detected air-fuel ratio to the lean side is greater than the change in the air-fuel ratio correction factor upon the change in the air-fuel ratio to the lean side.

The air-fuel ratio change data may be rates or accelerations of the changes in the detected air-fuel ratio to the rich and lean sides. The air-fuel ratio correction change data may be rates or accelerations of the changes in the air-fuel ratio correction factor to the rich and lean sides.

It is found that when the air-fuel ratio of the mixture is controlled to be near the stoichiometric value, the changes in the response characteristics of the air-fuel ratio sensor does not reflect on the air-fuel ratio change data and the air-fuel ratio correction factor change data properly. In order to alleviate this problem, the apparatus may further comprise a data determination permission circuit which works to selectively permit the air-fuel ratio change data and the air-fuel ratio correction factor change data to be determined based on behavior of the changes in the air-fuel ratio correction factor.

The data determination permission circuit may permit the air-fuel ratio change data and the air-fuel ratio correction factor change data to be determined only when an amount of the change in the air-fuel ratio correction factor within a given period of time upon the change in the air-fuel ratio to one of the rich and lean sides is greater than a given value.

The data determination permission circuit works to permit the air-fuel ratio change data to be determined a predetermined period of time after the air-fuel ratio correction factor change data starts to be determined.

The predetermined period of time may be a lag time between a change in amount of fuel to the engine and a resulting change in a gas atmosphere around the air-fuel ratio sensor.

The data determination permission circuit may permit the air-fuel ratio change data to be determined within a given period of time.

The determination permission circuit may prohibit the air-fuel ratio change data from being determined when an amount of the change in the air-fuel ratio correction factor upon the change in the air-fuel ratio to the rich side exceeds a given value, and the detected air-fuel ratio changes to the lean side or when an amount of the change in the air-fuel ratio correction factor upon the change in the air-fuel ratio to the lean side exceeds a given value, and the detected air-fuel ratio changes to the rich side.

The apparatus may further comprise a response parameter determining circuit which works to determine a response parameter so as to eliminate a difference between the response characteristics of the air-fuel ratio sensor upon the changes in the air-fuel ratio to the rich side and the lean side. The sensor failure detecting circuit may detect the predetermined failure of the air-fuel ratio sensor based on the response parameter.

The apparatus may further comprise an air-fuel ratio changing circuit working to intentionally change an air-fuel ratio of a mixture to the engine from the rich side to the lean side and from the rich side to the lean side. The sensor failure detecting circuit detects the predetermined failure of the air-fuel ratio based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

The air-fuel ratio changing circuit may determine at least one of a cycle and an amplitude of the intentional change in the air-fuel ratio as a function of an instantaneous operating condition of the engine.

When the air-fuel ratio is changed intentionally, the flow rate and velocity of the exhaust gas will be small in a low speed and low load range of the engine, thus resulting in an increased lag time between a change in amount of fuel injected into the engine and a resulting change in output of the air-fuel ratio sensor. In contrast, within a high speed and high load range of the engine, the flow rate and velocity of the exhaust gas will be great, thus resulting in a decreased lag time between a change in amount of fuel injected into the engine and a resulting change in output of the air-fuel ratio sensor. It is, thus, preferable that the air-fuel ratio changing circuit increases the at least one of the cycle and the amplitude of the intentional change in the air-fuel ratio within a low speed and a low load range of the engine and decreases the at least one of the cycle and the amplitude of the intentional change in the air-fuel ratio within a high speed and a high load range of the engine.

The air-fuel ratio changing circuit may oscillate a target air-fuel ratio from the rich side to the lean side and from the lean side to the rich side and switch the target air-fuel ratio between a rich side target air-fuel ratio and a lean side target air-fuel ratio each time the detected air-fuel ratio reaches the target air-fuel ratio.

According to the second aspect of the invention, there is provided an air-fuel ratio sensor failure detecting apparatus designed to detect a predetermined failure of an air-fuel ratio sensor installed in an exhaust line of an internal combustion engine. The apparatus comprises: (a) an air-fuel ratio change data determining circuit working to determine air-fuel ratio change data associated with changes in an air-fuel ratio, as detected through the air-fuel ratio sensor, to a rich and a lean side, respectively; (b) a response characteristic determining circuit working to determine response characteristics of the air-fuel ratio sensor upon the changes in the air-fuel ratio to the rich and lean sides, respectively, as functions of the air-fuel ratio change data, as determined upon the changes in the detected air-fuel ratio to the rich and lean sides; and (c) a sensor failure detecting circuit working to detect the predetermined failure of the air-fuel ratio sensor based on the response characteristics, as determined by the response characteristic determining circuit.

In the preferred mode of the invention, the sensor failure detecting circuit may compare the response characteristics of the air-fuel ratio sensor upon the changes in the air-fuel ratio to the rich and lean sides with given reference values to determine whether the air-fuel ratio sensor is failing in the response characteristic upon the change in the air-fuel ratio to the rich side or to the lean side based on results of comparison between the response characteristics of the air-fuel ratio sensor and the given reference values.

The sensor failure detecting circuit determines whether the air-fuel ratio sensor is failing in the response characteristic upon the change in the air-fuel ratio to the rich side or to the lean side based on a difference between the air-fuel ratio change data associated with changes in the detected air-fuel ratio to the rich side and the lean side.

The air-fuel ration change data may be rates or accelerations of the changes in the air-fuel ratio to the rich and lean sides.

The apparatus may further comprise a response parameter determining circuit which works to determine a response parameter so as to eliminate a difference between the response characteristics of the air-fuel ratio sensor upon the changes in the air-fuel ratio to the rich side and the lean side. The sensor failure detecting circuit may detect the predetermined failure of the air-fuel ratio sensor based on the response parameter.

The apparatus may further comprise an air-fuel ratio changing circuit working to intentionally change an air-fuel ratio of a mixture to the engine from the rich side to the lean side and from the rich side to the lean side. The sensor failure detecting circuit detects the predetermined failure of the air-fuel ratio based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

The air-fuel ratio changing circuit may determine at least one of a cycle and an amplitude of the intentional change in the air-fuel ratio as a function of an instantaneous operating condition of the engine.

The air-fuel ratio changing circuit may increase the at least one of the cycle and the amplitude of the intentional change in the air-fuel ratio within a low speed and a low load range of the engine and decrease the at least one of the cycle and the amplitude of the intentional change in the air-fuel ratio within a high speed and a high load range of the engine.

The air-fuel ratio changing circuit may oscillate a target air-fuel ratio from the rich side to the lean side and from the lean side to the rich side and switches the target air-fuel ratio between a rich side target air-fuel ratio and a lean side target air-fuel ratio each time the detected air-fuel ratio reaches the target air-fuel ratio.

According to the third aspect of the invention, there is provided a response characteristic detecting apparatus for an air-fuel ratio sensor installed in an exhaust line of an internal combustion engine. The apparatus comprise: (a) a correction factor determining circuit working to determine an air-fuel ratio correction factor to bring an air-fuel ratio of a mixture to the engine, as detected through the air-fuel ratio sensor, into agreement with a target value; (b) an air-fuel ratio change data determining circuit working to determine air-fuel ratio change data associated with changes in the detected air-fuel ratio to a rich and a lean side, respectively; (c) an air-fuel ratio correction factor change data determining circuit working to determine air-fuel ratio correction factor change data associated with changes in the air-fuel ratio correction factor upon changes in the air-fuel ratio to the rich and lean sides, respectively; (d) a response characteristic determining circuit working to determine response characteristics of the air-fuel ratio sensor upon the changes in the air-fuel ratio to the rich and lean sides, respectively, based on the air-fuel ratio change data and the air-fuel ratio correction factor change data; and (e) a data determination permission circuit which works to selectively permit the air-fuel ratio change data and the air-fuel ratio correction factor change data to be determined based on behavior of the changes in the air-fuel ratio correction factor.

In the preferred mode of the invention, the data determination permission circuit permits the air-fuel ratio change data and the air-fuel ratio correction factor change data to be determined only when an amount of the change in the air-fuel ratio correction factor within a given period of time upon the change in the air-fuel ratio to one of the rich and lean sides is greater than a given value.

The data determination permission circuit may work to permit the air-fuel ratio change data to be determined a predetermined period of time after the air-fuel ratio correction factor change data starts to be determined.

The predetermined period of time may be a lag time between a change in amount of fuel to the engine and a resulting change in a gas atmosphere around the air-fuel ratio sensor.

The data determination permission circuit may permit the air-fuel ratio change data to be determined within a given period of time.

The data determination permission circuit may prohibit the air-fuel ratio change data from being determined when an amount of the change in the air-fuel ratio correction factor upon the change in the air-fuel ratio to the rich side exceeds a given value, and the detected air-fuel ratio changes to the lean side or when an amount of the change in the air-fuel ratio correction factor upon the change in the air-fuel ratio to the lean side exceeds a given value, and the detected air-fuel ratio changes to the rich side.

The apparatus may further comprise an air-fuel ratio changing circuit working to intentionally change an air-fuel ratio of a mixture to the engine from the rich side to the lean side and from the rich side to the lean side. The response characteristic determining circuit determines the response characteristics based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

The air-fuel ratio changing circuit may determine at least one of a cycle and an amplitude of the intentional change in the air-fuel ratio as a function of an instantaneous operating condition of the engine.

The air-fuel ratio changing circuit may increase the at least one of the cycle and the amplitude of the intentional change in the air-fuel ratio within a low speed and a low load range of the engine and decreases the at least one of the cycle and the amplitude of the intentional change in the air-fuel ratio within a high speed and a high load range of the engine.

The air-fuel ratio changing circuit may oscillate a target air-fuel ratio from the rich side to the lean side and from the lean side to the rich side and switches the target air-fuel ratio between a rich side target air-fuel ratio and a lean side target air-fuel ratio each time the detected air-fuel ratio reaches the target air-fuel ratio.

According to the fourth aspect of the invention, there is provided an air-fuel ratio detecting apparatus for an internal combustion engine which comprises: (a) an air-fuel ratio sensor installed in an exhaust line of an internal combustion engine to produce an output that is a function of an air-fuel ratio of a mixture to the engine: (b) a correction factor determining circuit working to determine an air-fuel ratio correction factor to bring the air-fuel ratio, as detected through the air-fuel ratio sensor, into agreement with a target value; (c) an air-fuel ratio change data determining circuit working to determine air-fuel ratio change data associated with changes in the detected air-fuel ratio to a rich and a lean side, respectively; (d) an air-fuel ratio correction factor change data determining circuit working to determine air-fuel ratio correction factor change data associated with changes in the air-fuel ratio correction factor upon changes in the air-fuel ratio to the rich and lean sides, respectively; (e) a response characteristic determining circuit working to determine response characteristics of the air-fuel ratio sensor upon the changes in the air-fuel ratio to the rich and lean sides, respectively, as functions of the air-fuel ratio change data and the air-fuel ratio correction factor change data; and (f) an air-fuel ratio correcting circuit working to correct the detected air-fuel ratio using the response characteristics determined by the response characteristic determining circuit.

In the preferred mode of the invention, the air-fuel ratio correcting circuit may correct the detected air-fuel ratio so as to eliminate a difference between the response characteristics determined by the response characteristic determining circuit.

The apparatus may further comprise a response parameter determining circuit which works to determine a response parameter so as to eliminate the difference between the response characteristics of the air-fuel ratio sensor upon the changes in the air-fuel ratio to the rich side and the lean side. The air-fuel ratio correcting circuit corrects the detected air-fuel ratio using the response parameter.

The response characteristic determining circuit may determine the response characteristics of the air-fuel ratio sensor upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side.

The air-fuel ratio change data may be rates or accelerations of the changes in the detected air-fuel ratio to the rich and lean sides. The air-fuel ratio correction change data may also be rates or accelerations of the changes in the air-fuel ratio correction factor to the rich and lean sides.

According to the fifth aspect of the invention, there is provided an air-fuel ratio detecting apparatus for an internal combustion engine which comprises: (a) an air-fuel ratio sensor installed in an exhaust line of an internal combustion engine to produce an output that is a function of an air-fuel ratio of a mixture to the engine: (b) an air-fuel ratio change data determining circuit working to determine air-fuel ratio change data associated with changes in the detected air-fuel ratio to a rich and a lean side, respectively; and (c) an air-fuel ratio correcting circuit working to correct the detected air-fuel ratio based on the air-fuel ratio change data associated with the changes in the detected air-fuel ratio to the rich and lean sides.

In the preferred mode of the invention, the air-fuel ratio correcting circuit corrects the detected air-fuel ratio so as to eliminate a difference between response characteristics of the air-fuel ratio sensor upon the changes in the air-fuel ratio to the rich and lean sides.

The air-fuel ratio change data may be rates or accelerations of the changes in the detected air-fuel ratio to the rich and lean sides.

The air-fuel ratio correcting circuit may correct the detected air-fuel ratio so as to establish a given difference between response characteristics of the air-fuel ratio sensor upon the changes in the air-fuel ratio to the rich and lean sides.

The air-fuel ratio correcting circuit may advance or retard a phase of the detected air-fuel ratio to correct the detected air-fuel ratio.

The air-fuel ratio correcting circuit may correct the detected air-fuel ratio when given requirements at least related to a condition of the air-fuel ratio sensor are met.

The apparatus may further comprise an air-fuel ratio changing circuit working to intentionally change the air-fuel ratio of the mixture to the engine from the rich side to the lean side and from the rich side to the lean side. The air-fuel ratio correcting circuit may correct the detected air-fuel ratio based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

According to the sixth aspect of the invention, there is provided an air-fuel ratio controlling apparatus which comprises: (a) an air-fuel ratio sensor installed in an exhaust line of an internal combustion engine to produce an output that is a function of an air-fuel ratio of a mixture to the engine: (b) a correction factor determining circuit working to determine an air-fuel ratio correction factor to bring an air-fuel ratio, as detected through the air-fuel ratio sensor, into agreement with a target air-fuel ratio value; (c) an air-fuel ratio change data determining circuit working to determine air-fuel ratio change data associated with changes in the detected air-fuel ratio to a rich and a lean side, respectively; (d) an air-fuel ratio correction factor change data determining circuit working to determine air-fuel ratio correction factor change data associated with changes in the air-fuel ratio correction factor upon changes in the air-fuel ratio to the rich and lean sides, respectively; (e) a response characteristic determining circuit working to determine response characteristics of the air-fuel ratio sensor upon the changes in the air-fuel ratio to the rich and lean sides, respectively, as functions of the air-fuel ratio change data and the air-fuel ratio correction factor change data; and (f) a control parameter correcting circuit working to correct a control parameter using the response characteristics of the air-fuel ratio sensor. The control parameter is used in controlling the air-fuel ratio of the mixture to the engine.

In the preferred mode of the invention, the control parameter correcting circuit corrects the control parameter as a function of a difference between the response characteristics of the air-fuel ratio sensor upon the changes in the air-fuel ratio to the rich and lean sides.

The apparatus may further comprise a parameter determining circuit which works to determine a response parameter to bring the response characteristics of the air-fuel ratio sensor upon the changes in the air-fuel ratio to the rich and lean sides into agreement with each other. The control parameter correcting circuit corrects the control parameter using the response parameter.

The control parameter correcting circuit may correct the air-fuel ratio correction factor used as the control parameter.

The control parameter correcting circuit may alternatively correct the target air-fuel ratio value used as the control parameter.

The control parameter correcting circuit may alternatively correct a control gain used as the control parameter.

The response characteristic determining circuit may determine the response characteristics of the air-fuel ratio sensor upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side.

The control parameter correcting circuit may correct the control parameter when a deviation of the air-fuel ratio from the target air-fuel ratio increases.

The air-fuel ratio change data may be rates or accelerations of the changes in the detected air-fuel ratio to the rich and lean sides. The air-fuel ratio correction change data may be rates or accelerations of the changes in the air-fuel ratio correction factor to the rich and lean sides.

The apparatus may further comprise an air-fuel ratio changing circuit working to intentionally change the air-fuel ratio of the mixture to the engine from the rich side to the lean side and from the rich side to the lean side. The control parameter correcting circuit corrects the control parameter based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

The apparatus may further comprise an average determining circuit working to determine an average of the detected air-fuel ratio. The control parameter correcting circuit corrects the control parameter when the average of the detected air-fuel ratio lies far from a target average value by a predetermined amount.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
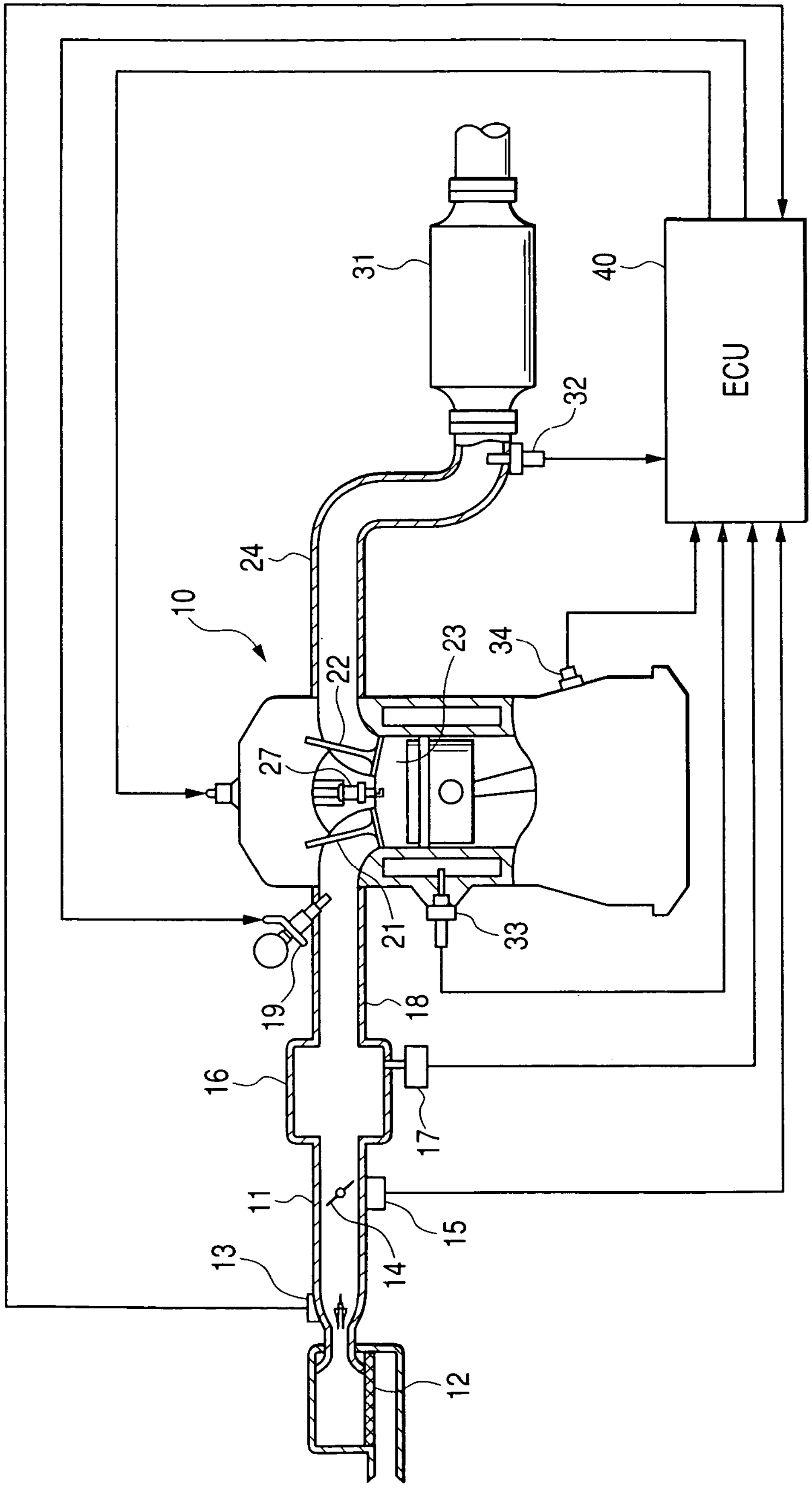
FIG. 1 is a structural diagram which shows an engine control system according to the invention.

Referring to the drawings, wherein like reference numbers refer to like parts in several views, particularly to FIG.

1, there is shown an automotive engine control system equipped with an air-fuel ratio detecting device according to the first embodiment of the invention. The engine control system works to control the fuel injection, the ignition timing, etc. of automotive multi-cylinder internal combustion engines. The air-fuel ratio detecting device is also equipped with an air-fuel ratio sensor monitor, as will be discussed later in detail.

The engine control system includes generally an electronic control unit (ECU) 40, an airflow meter 13, a throttle position sensor 15, an intake manifold pressure sensor 17, fuel injection valves 19, an air-fuel ratio sensor 32, a cooling water temperature sensor 33, and a crank angle sensor 34.

An internal combustion engine 10 connects with an intake pipe 11 and an exhaust pipe 24. An air cleaner 12 is installed in the intake pipe 11 upstream of the airflow meter 13. The airflow meter 13 works to measure the amount of intake air and provide a single indicative thereof to the ECU 40. A throttle valve 14 is installed in the intake pipe 11 downstream of the air flow meter 13. The throttle valve 14 is controlled in an angular position thereof by an actuator such as a DC motor. The throttle position sensor 15 is mounted on the intake pipe 11 and works to measure the angular position or valve position of the throttle valve 14 to provide a signal indicative thereof to the ECU 40. The intake pipe 11 also has located downstream of the throttle valve 14 a surge tank 16 to which an intake manifold 18 is connected which distributes the air between cylinders of the engine 10. The intake manifold pressure sensor 17 is installed in the surge tank 16 and works to measure the pressure in the surge tank 16 and outputs a signal indicative thereof to the ECU 40 as representing an intake pipe pressure. The fuel injection valves 19 are of a solenoid-operated type and mounted in the intake manifold 18 near intake ports of the cylinders of the engine 10, respectively.

The engine 10 has intake and exhaust valves 21 and 22 installed in the intake and exhaust ports, respectively. When the intake valves 21 are opened, it will cause an air-fuel mixture to be introduced into a combustion chamber 23. When the exhaust valves 22 are opened, it will cause burned from each cylinder to escape into the exhaust pipe 24 through an exhaust manifold. Spark plugs 27 are installed in a cylinder head of the engine 10 one for each cylinder. The spark plugs 27 are applied with high voltage at a selected ignition timing through an igniter equipped with a coil to produce a spark between center and ground electrodes of the spark plug 27, thereby igniting the mixture in the combustion chamber 23.

The exhaust pipe 24 has also installed therein a catalytic converter 31 such as a three-way catalytic converter which works to reduce harmful emissions such as Carbon monoxide (CO), Hydrocarbon (HC), and Nitrogen oxide (NOx). The air-fuel ratio sensor 32 implemented by, for example, a linear air-fuel ratio sensor is installed in the exhaust pipe 24 upstream of the catalytic converter 31. The air-fuel ratio sensor 32 works to measure the concentration of a specified component of the exhaust gas (e.g., the oxygen concentration) to produce an output correlated with an air-fuel ratio of a mixture injected into the engine 10. The cooling water temperature sensor 33 and the crank angle sensor 34 are installed in the cylinder block of the engine 10. The cooling water temperature sensor 33 works to measure the temperature of a cooling water and outputs a signal indicative thereof to the ECU 40. The crank angle sensor 34 works to measure an angular position of a crank of the engine 10 to outputs a signal indicative thereof to the ECU 40. For example, the crank angle sensor 34 is designed to produce a rectangular pulse signal at every crank angle of 30°.

The ECU 40 is made of a microcomputer equipped with a CPU, a ROM, a RAM, etc. and works to execute various control programs stored in the ROM to control the quantity of fuel to be sprayed from the fuel injection valves 19 and the ignition timing of the spark plugs 27. Especially, in the injection quantity control, the ECU 40 determines an air-fuel ratio correction factor FAF as a function of a difference between a target air-fuel ratio and an actual air-fuel ratio as measured by the air-fuel ratio sensor 32 and performs air-fuel ratio feedback control using the air-fuel ratio correction factor FAF.

Figure 9:
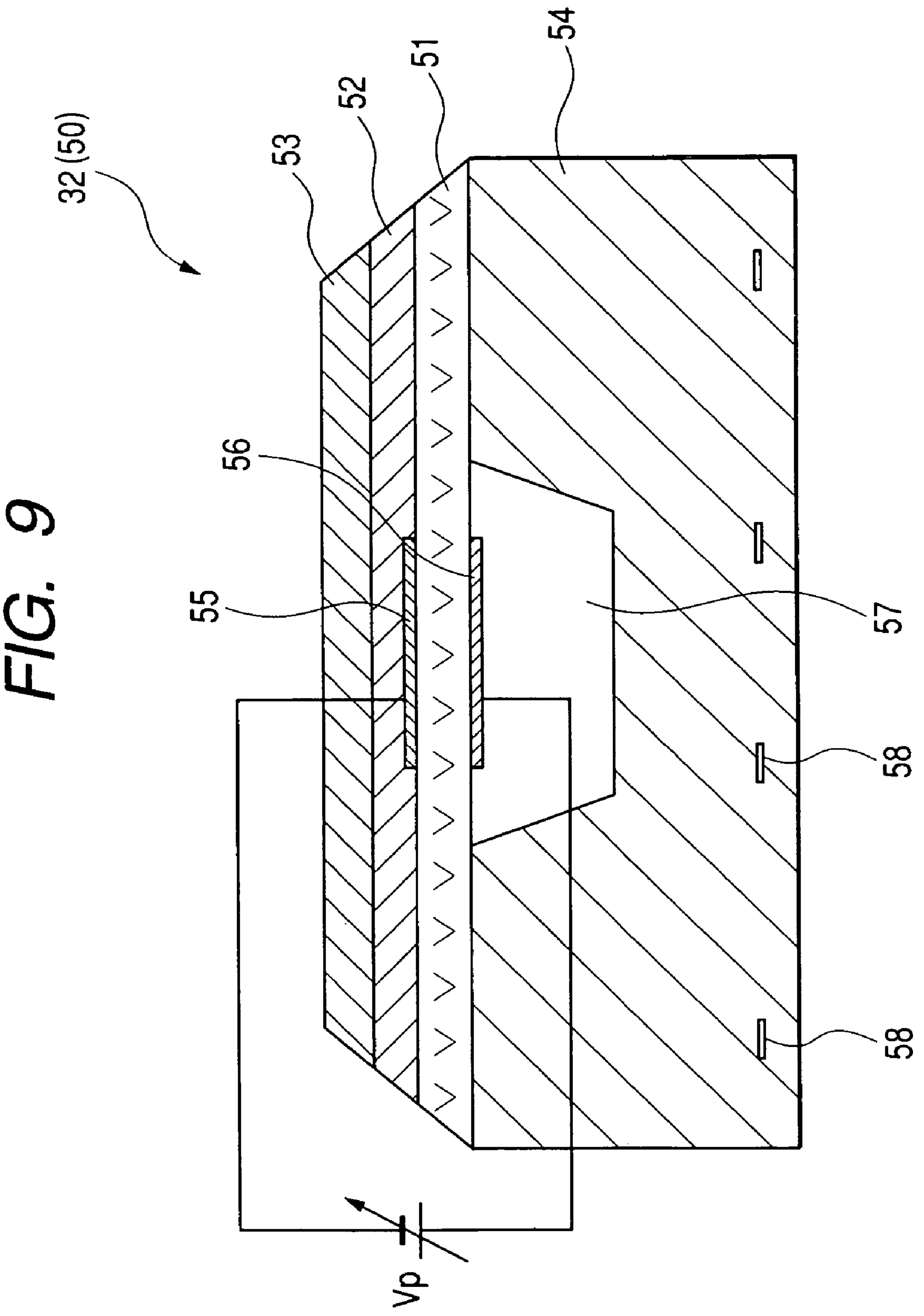
FIG. 9 is a transverse sectional view which shows an internal structure of an air-fuel ratio sensor.

The air-fuel ratio sensor 32, as shown in FIG. 9, includes a laminated sensor element 50 having a length extending perpendicular to the drawing. The laminated sensor element 50 is, in practice, installed within cylindrical housing and cover (not shown).

The sensor element 50 is made of a laminate of a solid electrolyte layer 51, a diffusion resistance layer 52, a shielding layer 53, and an insulating layer 54 and is covered with a protective layer (not shown). The solid electrolyte layer 51 is made of a partially-stabilized zirconia sheet strip to which an upper and a lower electrode 55 and 56 are affixed. The electrodes 55 and 56 are made of platinum. The diffusion resistance layer 52 is made of a porous sheet strip through which the exhaust gas of the engine 10 passes and reach the electrode 55. The shielding layer 53 is made of a dense layer which works to inhibit passage of the exhaust gas therethrough. The layers 52 and 53 are each formed by a sheet strip made of ceramic such as alumina or zirconia and have gas permeabilities different from each other which are determined by the mean diameter of pores in the layers 52 and 53 and the porosity thereof.

The insulating layer 54 is made of a ceramic material such as alumina or zirconia and has formed therein an air duct 57 to which the electrode 56 is exposed. The insulating layer 54 has embedded therein heaters 58 made of platinum. The heaters 58 are supplied with electric power from the battery and produce thermal energy to heat the whole of the sensing element 50 up to a desired activation temperature. In the following discussion, the electrodes 55 and 56 will also be referred to as a diffusion layer-exposed electrode and an air-exposed electrode, respectively.

The air-fuel ratio sensor 32 is mounted on the exhaust pipe 24 so that the exhaust gasses impinge on a part of the sensing element 50, and the other part has access to the atmosphere. Specifically, the exhaust gasses flowing within the exhaust pipe 24 enter the diffusion resistance layer 52 at a side surface thereof. When the exhaust gas is lean (i.e., an excess of oxygen), the ECU 40 applies the voltage across the electrodes 55 and 56 to decompose or ionize oxygen molecules contained in the exhaust gas on the diffusion layer-exposed electrode 55, thereby producing oxygen ions which, in turn, pass through the solid electrolyte layer 51 and are discharged by the air-exposed electrode 56 to the air duct 57. This results in an electric current flowing from the air-exposed electrode 56 to the diffusion layer-exposed electrode 55 which is outputted as a sensor output as a function of the level of the current. Alternatively, when the exhaust gas is rich (i.e., a lack of oxygen), the ECU 40 applies the voltage across the electrodes 55 and 56 to decompose or ionize oxygen molecules contained in air within the air duct 57 on the air-exposed electrode 56, thereby producing oxygen ions which, in turn, pass through the solid electrolyte layer 51 and escape from the diffusion layer-exposed electrode 55. The oxygen ions then undergoes catalyzed reaction with unburned products such as HC or CO components of the exhaust gas. This results in an electric current flowing from the diffusion layer-exposed electrode 55 to the air-exposed electrode 56 which is outputted as the sensor output as a function of the level of the current.

The air-fuel ratio sensor 32, as described above, works to decompose the oxygen molecules on either of the diffusion layer-exposed electrode 55 and the air-exposed electrode 56 and may have response characteristics which are different between when the exhaust gas is rich and when it is lean if reaction speeds are different between the electrodes 55 and 56. This response difference usually arises from an initial reactive failure of the air-fuel ratio sensor 32 or aging thereof and is considered to have an adverse affect on the air-fuel ratio control. In order to solve this problem, the ECU 40 is designed to have an air-fuel ratio monitor working to monitor the response characteristics when the exhaust gas is changed to the rich condition and when it is changed to the lean condition to detect a failure or deterioration in the response characteristics of the air-fuel ratio sensor 32.

Figure 2:
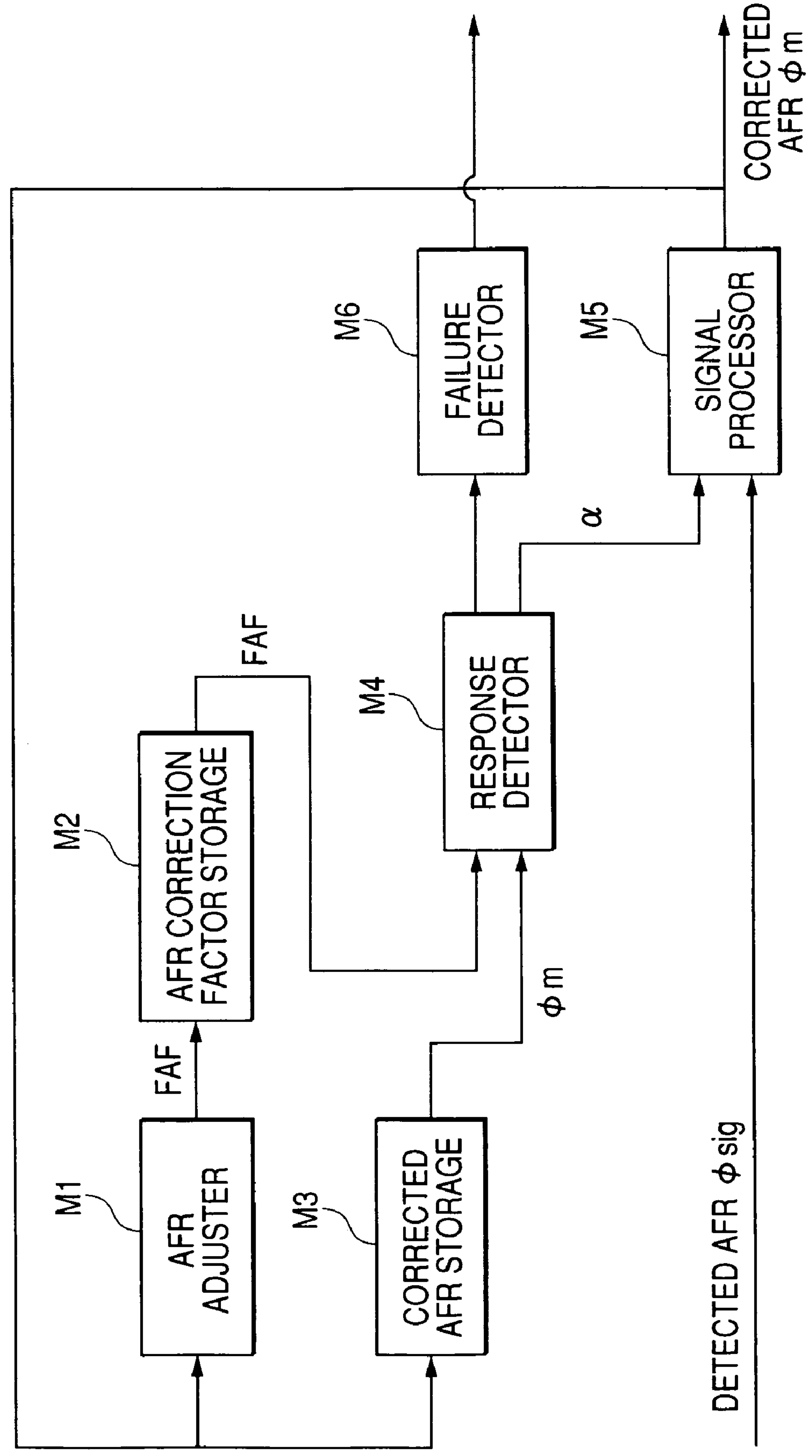
FIG. 2 is a block diagram which shows an air-fuel ratio detecting device according to the first embodiment of the invention.

The air-fuel ratio detecting device is made of functional blocks, as shown in FIG. 2, constructed in the ECU 40. Specifically, the air-fuel ratio detecting device consists of an air-fuel ratio adjusting circuit M1, an air-fuel ratio correction factor storage M2, a corrected air-fuel ratio storage M3, a response detector M4, an air-fuel ratio sensor signal processing circuit M5, and a sensor failure detector M6.

The air-fuel ratio adjusting circuit M1 works to calculate the air-fuel ratio correction factor FAF as a function of a difference between a corrected air-fuel ratio ϕm, as read out of the air-fuel ratio sensor signal processing circuit M5, and a target air-fuel ratio. The air-fuel ratio correction factor storage M2 stores therein the value of the air-fuel ratio correction factor FAF, as determined one sampling cycle earlier, and that, as determined in the current sampling cycle. The corrected air-fuel ratio storage M3 works to store therein the value of the corrected air-fuel ratio ϕm, as determined one sampling cycle earlier, and that, as determined in the current sampling cycle. The response detector M4 works to calculates a response parameter α indicative of a response rate of the air-fuel ratio sensor 32 when the exhaust gas is changed to the rich or lean condition as functions of the air-fuel ratio correction factor FAF and the corrected air-fuel ratio ϕm. The air-fuel ratio sensor signal processing circuit M5 works to calculate an air-fuel ratio ϕsig using an output of the air-fuel ratio sensor 32 and determines the corrected air-fuel ratio ϕm based on the response parameter α and the air-fuel ratio ϕsig. The sensor failure detector M6 works to detect a failure of the air-fuel ratio sensor 32 using the response parameter α, as outputted from the response detector M4. In the following discussion, an excess fuel rate (i.e., the amount of fuel/the amount of air) will be referred to as representing the air-fuel ratio of a mixture to the engine 10. Note that an air excess ratio may alternatively be used.

The above functions are implemented by control programs in the ECU 40. The operations of the air-fuel ratio adjusting circuit M1, the response detector M4, the air-fuel ratio sensor signal processing circuit M5, and the sensor failure detector M6 will be described below.

Figure 3:
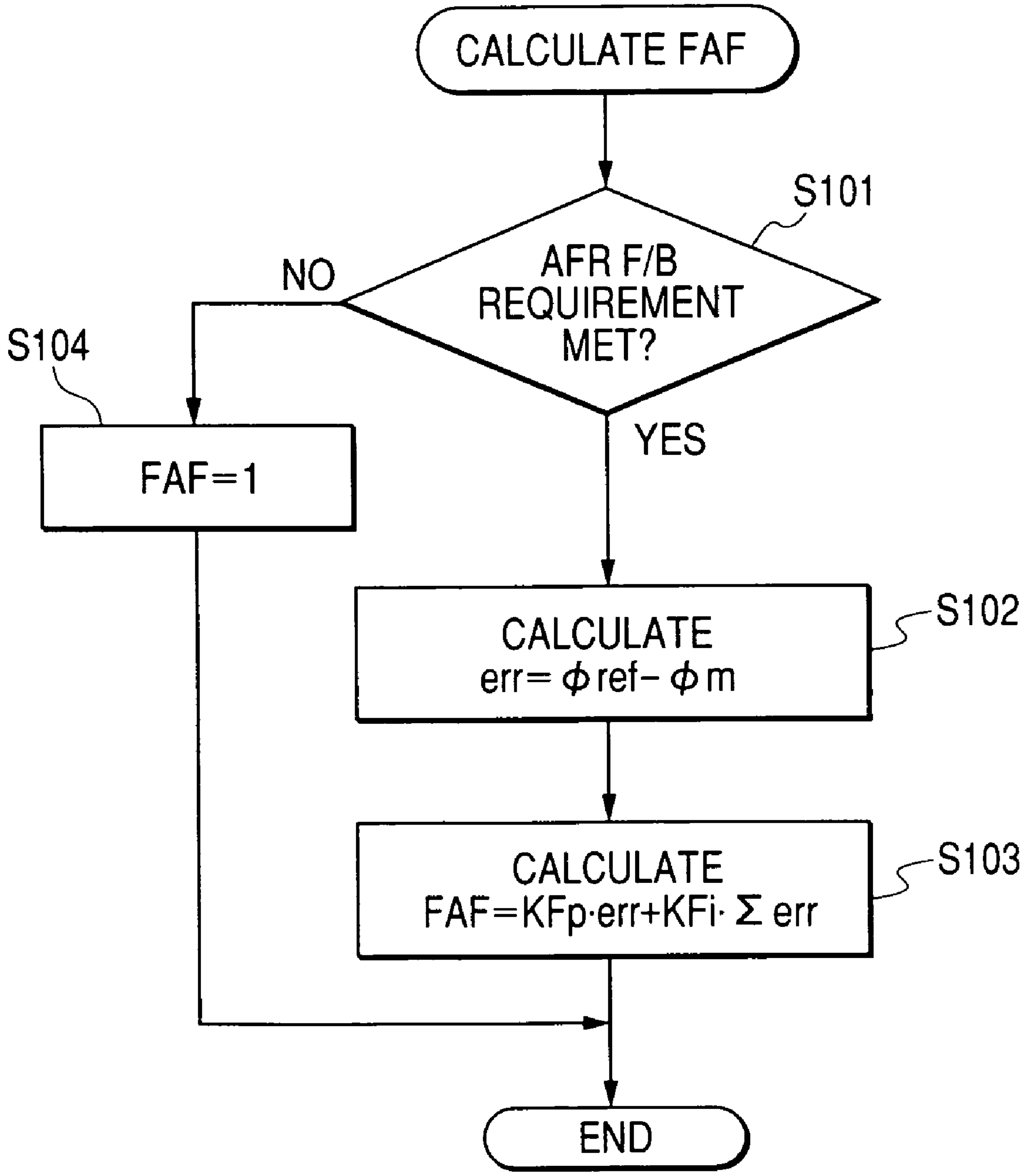
FIG. 3 is a flowchart of a program to determine an air-fuel ratio correction factor.

FIG. 3 is a flowchart of logical steps or program to be executed in the air-fuel ratio adjusting circuit M1 to determine the air-fuel ratio correction factor FAF.

After entering the program, the routine proceeds to step 101 wherein it is determined whether air-fuel ratio feedback control requirements are met or not. The requirements include conditions where the temperature of a cooling water of the engine 10 (i.e., an output of the cooling water temperature sensor 33) is greater than a given value, where the engine 10 is not placed in high speed and high load states, and where the air-fuel ratio sensor 32 is placed in an activated state. If a YES answer is obtained in step 101 meaning that the air-fuel ratio feedback control requirements are met, then the routine proceeds to step 102 wherein an air-fuel ratio deviation err that is a difference between the corrected air-fuel ratio ϕm and the target air-fuel ratio ϕref (i.e., error=ϕref−ϕm) is calculated. The routine proceeds to step 103 wherein the air-fuel ratio correction factor FAF is determined by a known PI control technique according to the following equation.

$$FAF = KFp \cdot \mathrm{err} + KFi \cdot \Sigma \mathrm{err}$$

where KFp is a proportion gain, and KFi is an integral gain.

Note that the determination of the air-fuel ratio correction factor FAF may alternatively be made using another known technique. For instance, the air-fuel ratio correction factor FAF may be determined as a function of the value thereof, as determined in a previous program cycle or using a dynamic model representing the behavior of the engine 10.

If a NO answer is obtained meaning that the air-fuel ratio feedback control requirements are not met, then the routine proceeds to step 104 wherein the air-fuel ratio correction factor FAF is set to one (1).

Figure 4:
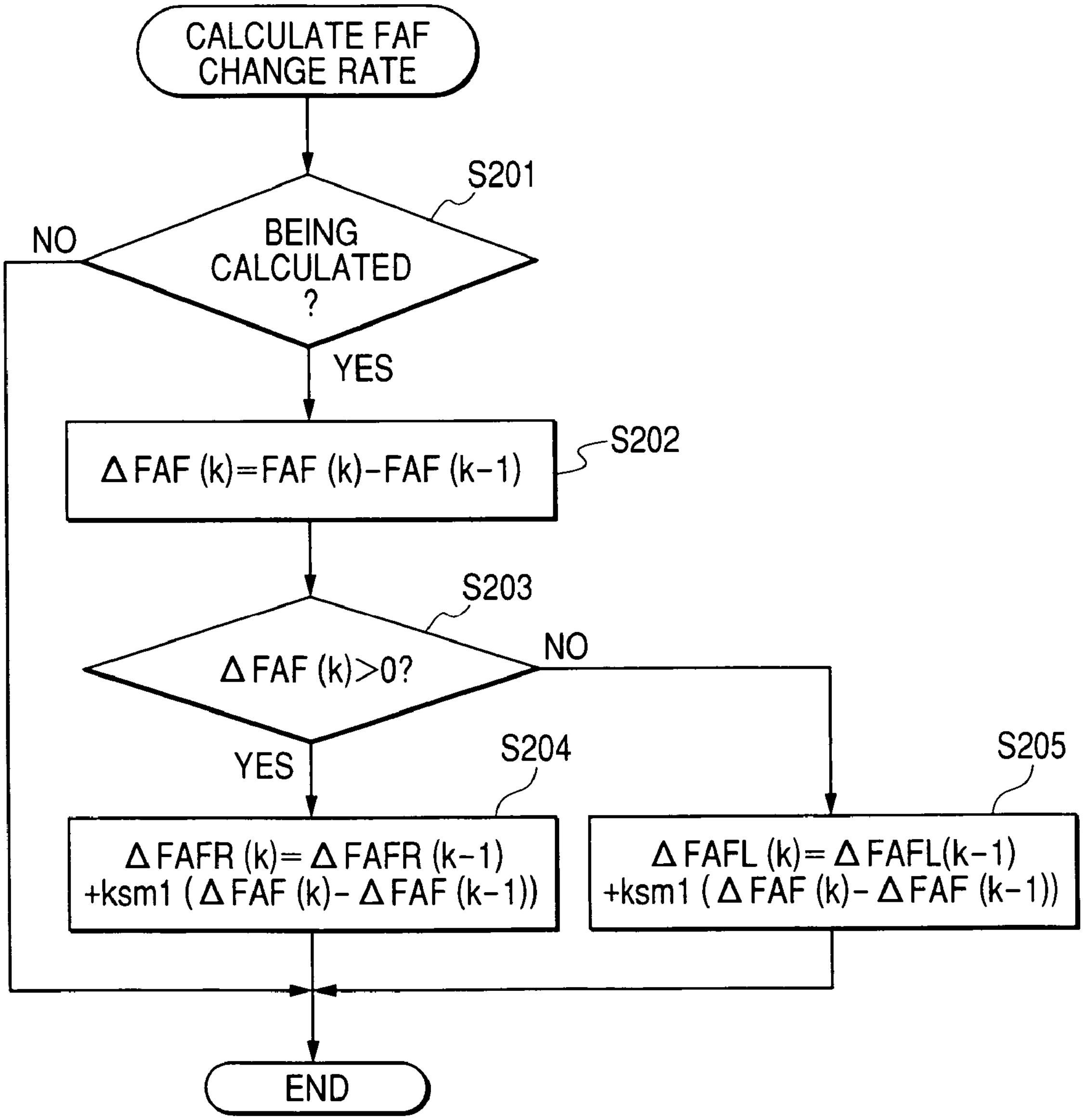
FIG. 4 is a flowchart of a program to determine a rate of change in air-fuel ratio correction factor.
Figure 5:
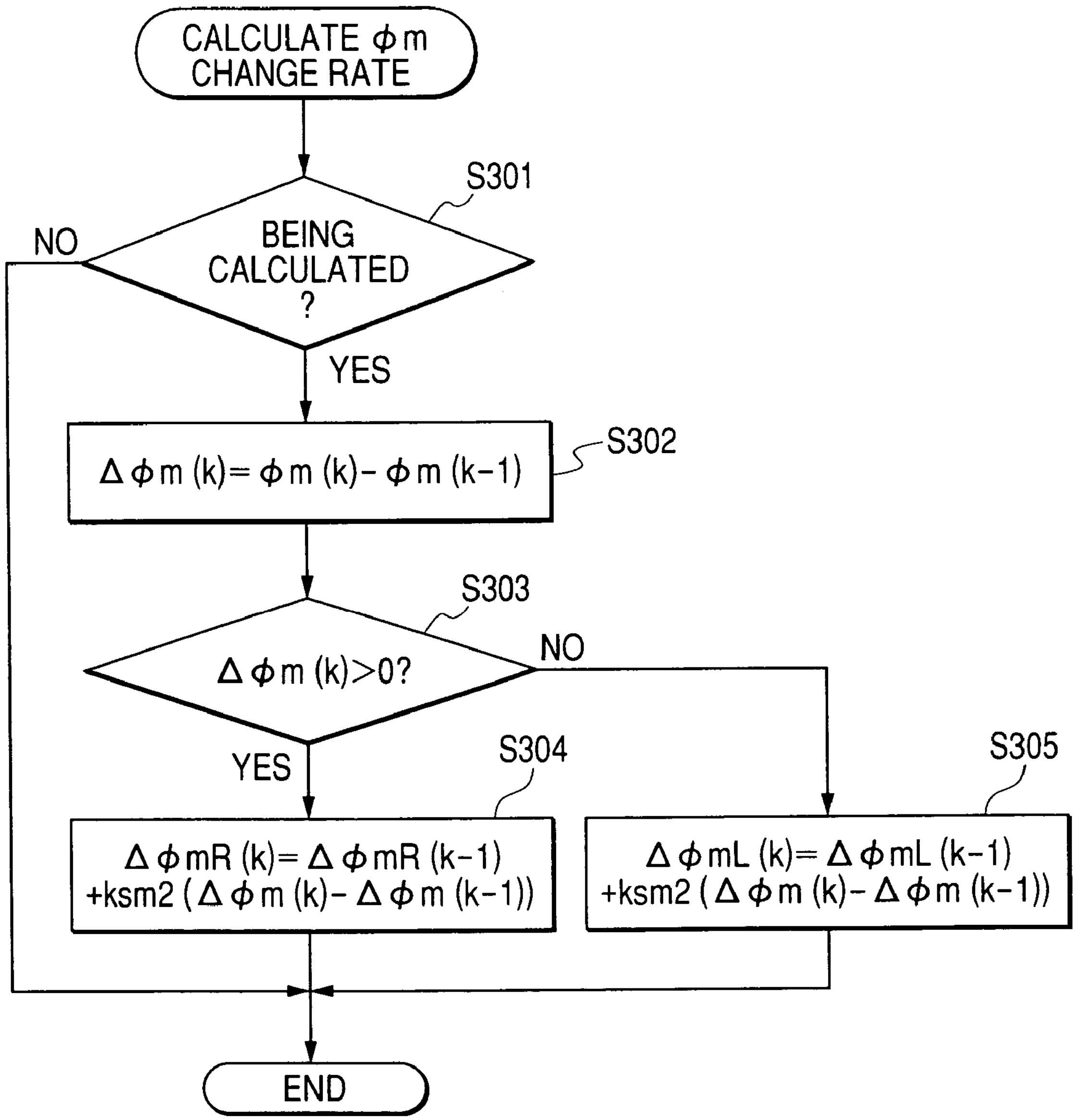
FIG. 5 is a flowchart of a program to determine a rate of change in corrected air-fuel ratio.
Figure 6:
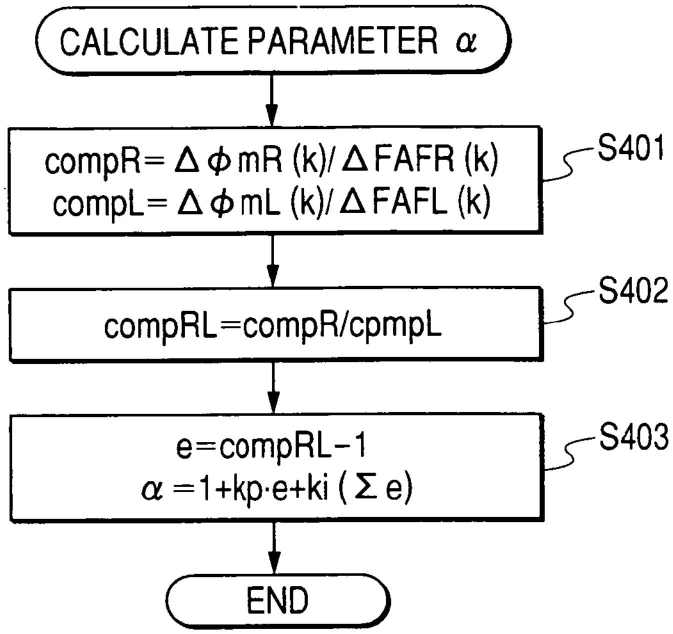
FIG. 6 is a flowchart of a program to determine a response parameter associated with response characteristics of an air-fuel ratio sensor.

FIGS. 4 to 6 are flowcharts of programs to be executed in the response detector M4 of the ECU 40.

The program of FIG. 4 is to calculate a rate of change in the air-fuel ratio correction factor FAF.

First, in step 201, it is determined whether the air-fuel ratio correction factor FAF is now being calculated or not. If a YES answer is obtained meaning that the air-fuel ratio correction factor FAF is now being calculated, then the routine proceeds to step 202 wherein a correction factor change ΔFAF is determined that is the value FAF(k) of the air-fuel ratio correction factor FAF, as having been determined in this program cycle, minus the value FAF(k−1) of the air-fuel ratio correction factor FAF, as determined one program cycle earlier, where k indicates the number of program cycles. The routine proceeds to step 203 wherein it is determined whether the correction factor change ΔFAF is greater than zero (0) or not. The fact that the correction factor change ΔFAF is greater than zero (0) means that the quantity of fuel to be injected by the fuel injector valves 19 has been corrected to be increased, so that the air-fuel ratio is changing to the rich side.

If a YES answer is obtained in step 203 (ΔFAF>0), then the routine proceeds to step 204 wherein the correction factor change rate ΔFAFR that is a rate of change in the air-fuel ratio correction factor FAF upon the change of the air-fuel ratio to the rich side is determined according to the following equation:

$$\Delta FAFR(k) = \Delta FAFR(k-1) + ksm1(\Delta FAFR(k) - \Delta FAFR(k-1))$$

where ksm1 is a smoothing gain.

If a NO answer is obtained in step 203, then the routine proceeds to step 205 wherein the correction factor change rate ΔFAFL that is a rate of change in the air-fuel ratio correction factor FAF upon the change of the air-fuel ratio to the lean side is determined according to the following equation:

$$\Delta FAFL(k) = \Delta FAFL(k-1) + ksm1(\Delta FAFL(k) - \Delta FAFL(k-1)$$

In the above manner, change data on the air-fuel ratio correction when the air-fuel ratio is changed to the rich and lean side are derived as the correction factor change rates ΔFAFR and ΔFAFL.

The program of FIG. 5 will be described below which is to calculate a rate of change in the corrected air-fuel ratio ϕm.

First, in step 301, it is determined whether the corrected air-fuel ratio ϕm is now being calculated or not. If a YES answer is obtained meaning that the corrected air-fuel ratio ϕm is now being calculated, then the routine proceeds to step 302 wherein a corrected air-fuel ratio change Δϕm is determined that is the value ϕm(k) of the corrected air-fuel ratio ϕm, as having been determined in this program cycle, minus the value ϕm(k−1) of the corrected air-fuel ratio ϕm, as determined one program cycle earlier. The routine proceeds to step 303 wherein it is determined whether the corrected air-fuel ratio change Δϕm is greater than zero (0) or not. The fact that the corrected air-fuel ratio change a Δϕm is greater than zero (0) means that the excess fuel rate, as described above, has increased, so that the air-fuel ratio is changing to the rich side.

If a YES answer is obtained in step 303 (Δϕm>0), then the routine proceeds to step 304 wherein the corrected air-fuel ratio change rate a ΔϕmR that is a rate of change in the corrected air-fuel ratio ϕm upon the change of the air-fuel ratio to the rich side is determined according to the following equation:

$$\Delta\phi mR(k)=\Delta\phi mR(k-1)+ksm2(\Delta\phi m(k)-\Delta\phi m(k-1)$$

where ksm2 is a smoothing gain.

If a NO answer is obtained in step 303, then the routine proceeds to step 305 wherein the corrected air-fuel ratio change rate ΔϕmL that is a rate of change in the corrected air-fuel ratio ϕm upon the change of the air-fuel ratio to the lean side is determined according to the following equation:

$$\Delta\phi mL(k)=\Delta\phi mL(k-1)+ksm2(\Delta\phi m(k)-\Delta\phi m(k-1)$$

In the above manner, change data on the corrected air-fuel ratio ϕm when the air-fuel ratio is changed to the rich and lean side are derived as the corrected air-fuel ratio change rates ΔϕmR and ΔϕmL.

The program of FIG. 6 will be described blow which is to calculate the response parameter α.

First, in step 401, an AFR (air-fuel ratio) change rate-to-AFR correction factor change rate ratio compR is determined that is a ratio of the corrected air-fuel ratio change rate ΔϕmR to the correction factor change rate ΔFAFR upon the change in the air-fuel ratio to the rich side (i.e., ΔϕmR(k)/ΔFAFR(k)). Additionally, an AFR change rate-to-AFR correction factor change rate ratio compL is determined that is a ratio of the corrected air-fuel ratio change rate ΔϕmL to the correction factor change rate ΔFAFL upon the change in the air-fuel ratio to the lean side (i.e., ΔϕmL(k)/ΔFAFL(k)).

The routine proceeds to step 402 wherein a ratio compRL is determined that is a ratio of the AFR change rate-to-AFR correction factor change rate ratio compR to the AFR change rate-to-AFR correction factor change rate ratio compL, as derived in step 401.

The routine proceeds to step 403 wherein the response parameter α is determined using a PI compensator to bring the ratio compRL into agreement with one (1). Specifically, the response parameter α is calculated according to equations below.

$$e=\text{comp}RL-1$$

$$\alpha=1+kp\cdot e+ki(\Sigma e)$$

where kp is a proportional gain, ki is an integral gain.

In the above manners, as response data on the air-fuel ratio sensor 32, the AFR change rate-to-AFR correction factor change rate ratio compR when the air-fuel ratio is changed to the rich side the AFR change rate-to-AFR correction factor change rate ratio compL when the air-fuel ratio is changed to the lean side, and the response parameter α are derived.

The ECU 40 is designed to process an output of the air-fuel ratio sensor 32 using a phase advance filter. The transfer function thereof is expressed as $$H(s)=\frac{1+\alpha As}{1+As}(1<\alpha) \tag{1}$$

where A is a middle value of a time constant of the sensor 32.

The bilinear s-z transformation for transforming the continuous time into the discrete time is given by $$s=h\frac{1-Z^{-1}}{1+Z^{-1}} \tag{2}$$

where h=2/T, and Tis a sampling time.

From Eq. (2), Eq. (1) is rewritten as $$H(z)=\frac{(1+\alpha Ah)+(1-\alpha Ah)Z^{-1}}{(1+Ah)+(1-Ah)Z^{-1}} \tag{3}$$

Converting or expanding Eq. (3) into a difference equation, we obtain $$y(n)=\frac{1+\alpha Ah}{1+Ah}U(n)+\frac{1-\alpha Ah}{1+Ah}U(n-1)-\frac{1-Ah}{1+Ah}Y(n-1) \tag{4}$$

where Y is a filter output, and U is a filter input.

Eq. (4) functions to advance the phase of the detected air-fuel ratio ϕsig that is the filter input, thereby deriving the corrected air-fuel ratio ϕm.

Figure 7:
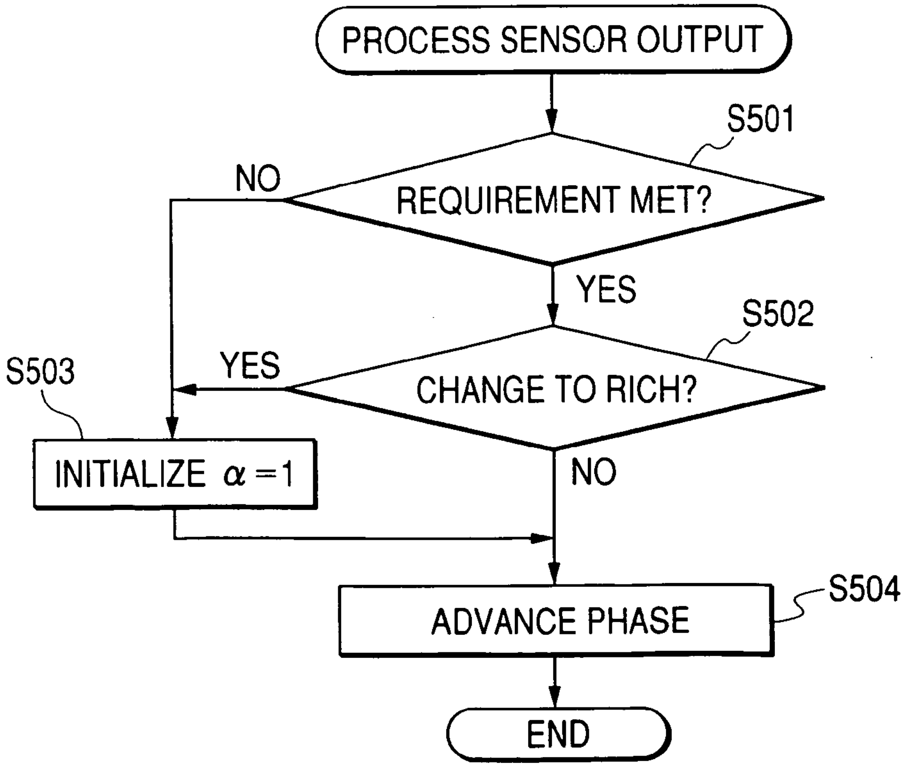
FIG. 7 is a flowchart of a program to process an output of an air-fuel ratio sensor.

FIG. 7 is a flowchart of a program to be executed by the air-fuel ratio sensor signal processing circuit M5 of the ECU 40.

After entering the program, the routine proceeds to step 501 wherein signal processing requirements are met or not. The requirements include conditions where the air-fuel ratio sensor 32 has not failed and is now placed in an activated state. If a YES answer is obtained, then the routine proceeds to step 502 wherein it is determined whether the air-fuel ratio has changed to the rich side or not. This determination is made by determining whether a difference between the value of the air-fuel ratio ϕsig, as derived in this program cycle and that, as derived one program cycle earlier shows a positive value (i.e., current value−previous value) or not.

If it shows the positive value, it is concluded that the air-fuel ratio has changed to the rich side.

If a YES answer is obtained in step 502 meaning that the air-fuel ratio has changed to the rich side, then the routine proceeds to step 503 wherein the response parameter α is initialized to one (1). Alternatively, if a NO answer is obtained in step 502, then the routine proceeds to step 504 wherein the phase of the air-fuel ratio ϕsig is advanced using Eq. (4), as described above. Specifically, the air-fuel ratio ϕsig is corrected as a function of the response parameter α to derive the corrected air-fuel ratio ϕm.

Figure 8:
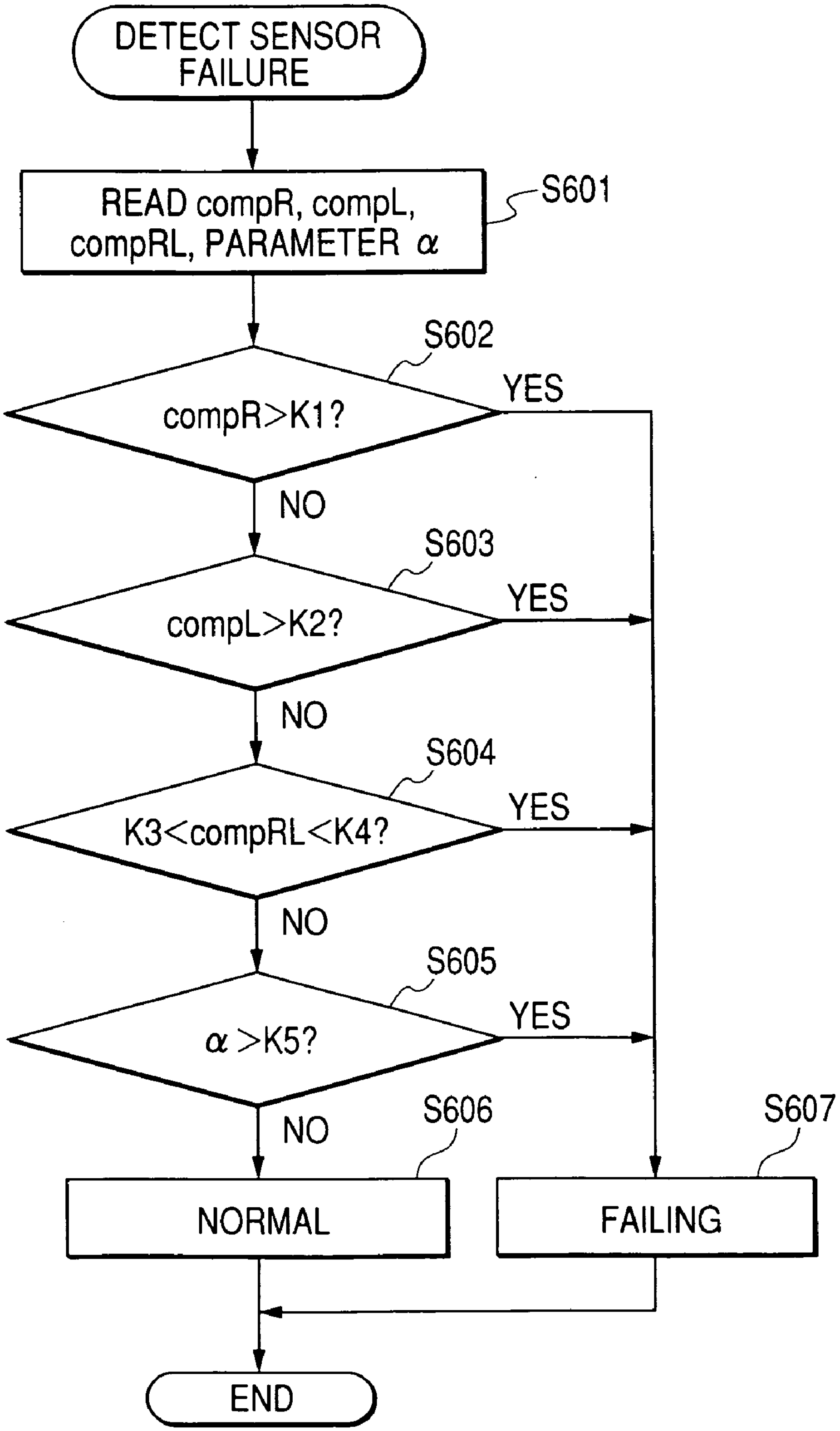
FIG. 8 is a flowchart of a program to monitor a failure of an air-fuel ratio sensor.

FIG. 8 is a flowchart of a program to be executed by the sensor failure detector M6 of the ECU 40.

After entering the program, the routine proceeds to step 601 wherein the AFR change rate-to-AFR correction factor change rate ratio compR, the AFR change rate-to-AFR correction factor change rate ratio compL, the ratio compRL, and the response parameter α, as derived in the operations of FIG. 6, are read.

The routine proceeds to step 602 wherein it is determined whether the AFR change rate-to-AFR correction factor change rate ratio compR is greater than a given reference value K1 or not. If a NO answer is obtained, then the routine proceeds to step 603 wherein it is determined whether the AFR change rate-to-AFR correction factor change rate ratio compL is greater than a given reference value K2 or not. If a NO answer is obtained, then the routine proceeds to step 604 wherein it is determined whether the ratio compRL is greater than a given reference value K3 and smaller than a given reference value K4 or not. If a NO answer is obtained, then the routine proceeds to step 605 wherein it is determined whether the response parameter α is greater than a given reference value K5 or not. Note that the reference values K1 to K5 are threshold values used in determining whether the air-fuel ratio sensor 32 is failing or not and that the value K1 may be equal to the value K2, but the value K3 is smaller than one (1), and the value K4 is greater than one (1).

If the values of the corrected air-fuel ratio ϕm upon changes in air-fuel ratio to the rich side and to the lean side are significantly greater than the values of the air-fuel ratio correction factor FAF upon changes in air-fuel ratio to the rich side and to the lean side, respectively, YES answers are obtained in steps 602 and 603. If response rates of the air-fuel ratio sensor 32 upon changes in air-fuel ratio to the rich side and the lean side are greatly different from each other, YES answers are obtained in steps 604 and 605.

If NO answers are obtained in all steps 602 to 605, then the routine proceeds to step 606 wherein it is determined that the air-fuel ratio sensor 32 is operating properly. Alternatively, if a YES answer is obtained in any one of steps 602 to 605, then the routine proceeds to step 607 wherein it is determined that the response of the air-fuel ratio sensor 32 to a change in the air-fuel ratio (i.e., a change in concentration of oxygen) is deteriorated, that is, that the air-fuel ratio sensor 32 is failing in operation thereof.

As apparent from the above discussion, the air-fuel ratio detecting device of the engine control system of the first embodiment works as the air-fuel ratio sensor monitor which measures the response rates of the air-fuel ratio sensor 32 when the air-fuel ratio of a mixture has changed to the rich side and when it has changed to the lean side independently from each other to detect the deterioration of reactive characteristics or rate of response to a change in the air-fuel ratio.

The response data on the air-fuel ratio sensor 32 (i.e., the AFR change rate-to-AFR correction factor change rate ratios compR and compL) is, as described above, derived as functions of data on changes in the corrected air-fuel ratios ϕm upon changes in air-fuel ratio to the rich and lean sides (i.e., the corrected air-fuel ratio change rates ΔϕmR and ϕmL). Specifically, the response data is obtained in terms of a correlation between the change in the corrected air-fuel ratio ϕm and the change in the air-fuel ratio correction factor FAF, thereby increasing the reliability of the response data to ensure the accuracy of detecting the failure of the air-fuel ratio sensor 32.

The air-fuel ratio detecting device of the engine control system according to the second embodiment will be described below.

It is found that when the air-fuel ratio is near a target one, the deterioration of reactive characteristics of the air-fuel ratio sensor 32 hardly effect on the air-fuel ratio change data (i.e., the corrected air-fuel ratio change rates ΔϕmR and ΔϕmL) and the correction factor change data (i.e., the correction factor change rates ΔFAFR and ΔFAFL). In order to alleviate such a problem, the air-fuel ratio monitor of this embodiment is designed to monitor the behavior of changing of the above data to prohibit the determination thereof selectively. This results in improved accuracy of detecting the failure (i.e., the deterioration of the reactive characteristics) of the air-fuel ratio sensor 32.

Figure 10:
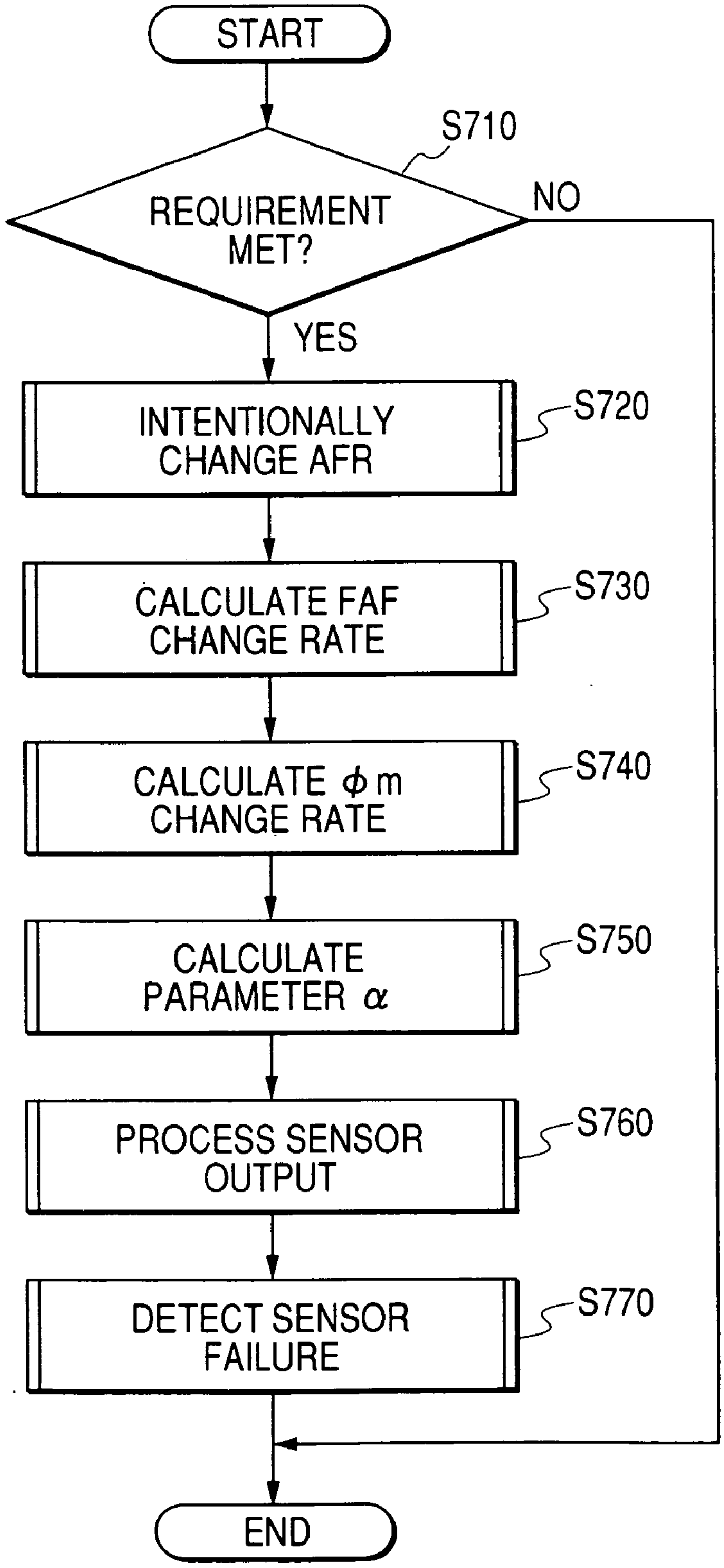
FIG. 10 is a flowchart of a program to monitor a failure of an air-fuel ratio sensor according to the second embodiment of the invention.

FIG. 10 is a flowchart of a program to be executed by the ECU 40 at regular time intervals to detect the failure of the air-fuel ratio sensor 32 in the second embodiment.

First, in step 710, failure detection permissible conditions are met or not. For instance, the ECU 40 monitors the speed of and load on the engine 10, the temperature of the cooling water, and the activated state of the air-fuel ratio sensor 32. When the engine 10 has been warmed up completely and is operating in middle speed and middle load conditions, a YES answer is obtained meaning that the failure detection permissible conditions have been met. The routine then proceeds to following steps 720 to 770. Alternatively, if a NO answer is obtained, then the routine terminates.

Step 720 is to change the air-fuel ratio intentionally. Step 730 is to calculate the rate of change in the air-fuel ratio correction factor FAF. Step 740 is to calculate the rate of change in the corrected air-fuel ratio ϕm. Step 750 is to calculate the response parameter α. Step 760 is to process an output of the air-fuel ratio sensor 32. Step 770 is to detect the failure of the air-fuel ratio sensor 32. Steps 720, 730, and 740 will be discussed below with reference to FIGS. 11, 12, and 15. Steps 750, 760, and 770 are identical in operations with FIGS. 6, 7, and 8, and explanation thereof in detail will be omitted here.

Figure 11:
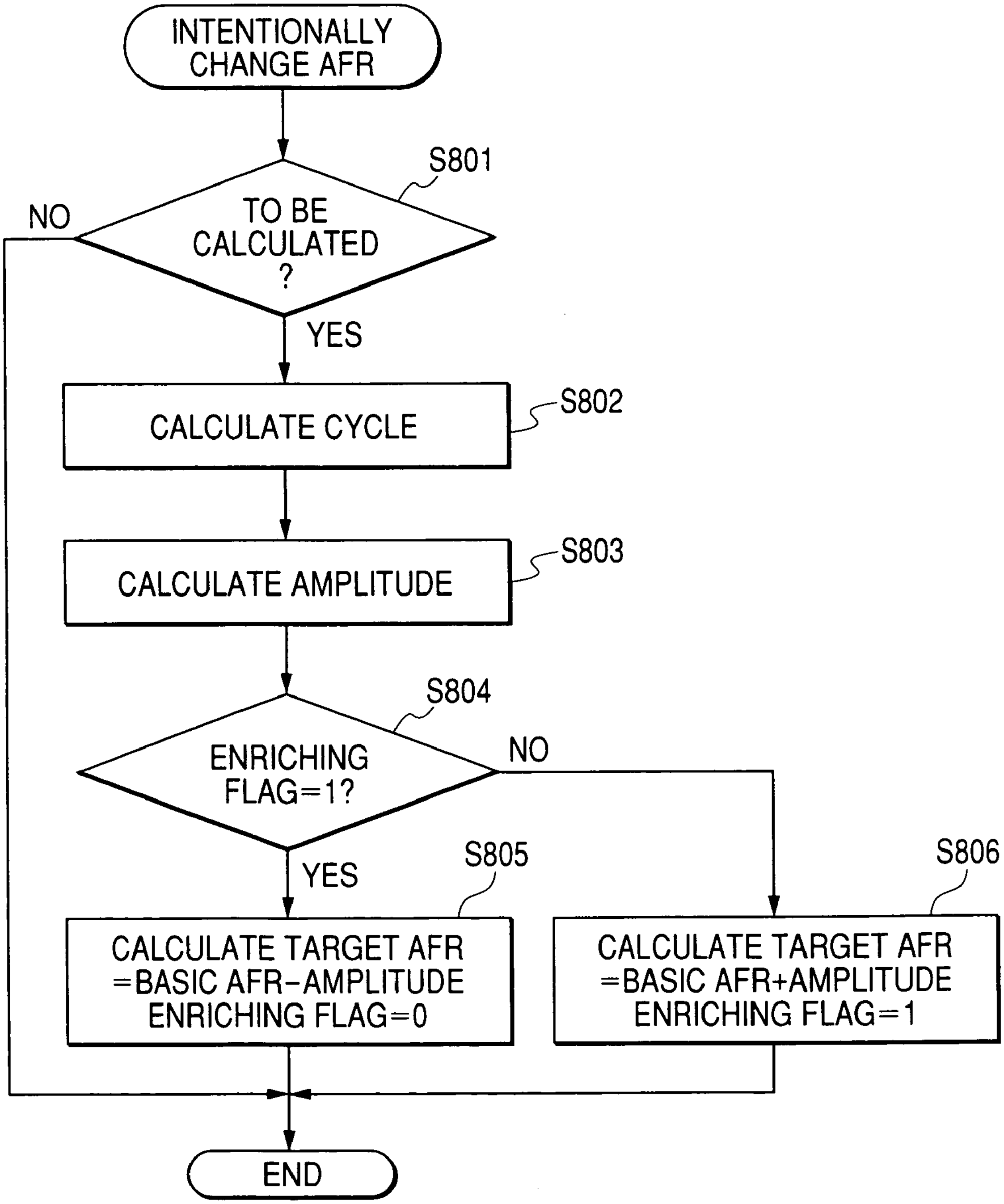
FIG. 11 is a flowchart of a program to change an air-fuel ratio of a mixture to an engine intentionally.
Figure 16:
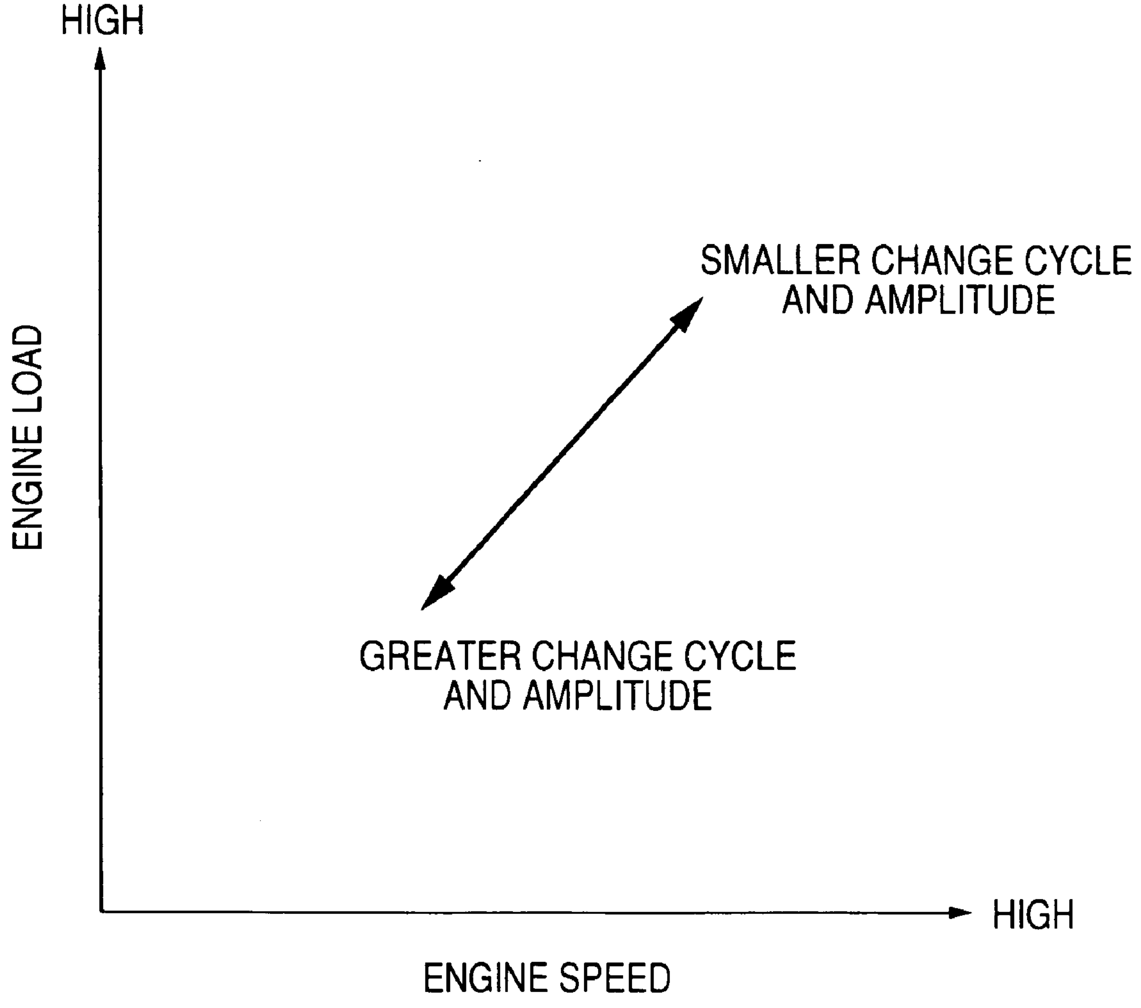
FIG. 16 is a map which lists selectable values of a cycle and an amplitude of change in air-fuel ratio in terms of an engine speed and an engine load.

After entering the program in FIG. 11, the routine proceeds to step 801 wherein the cycle and the amplitude of a periodic change in the air-fuel ratio is to be calculated or not. For example, it is determined whether the time when the air-fuel ratio is reversed (i.e., half an air-fuel ratio change cycle, as will be described later) has been reached or not. If a NO answer is obtained, then the routine terminates. Alternatively, if a YES answer is obtained, then the routine proceeds to steps 802 and 803 to determine the cycle in which the air-fuel ratio changes and the amplitude of such a change in the air-fuel ratio. For instance, the calculations in steps 802 and 803 are made by look-up using a map, as illustrated in FIG. 16, in terms of operating conditions of the engine 10. Specifically, when the engine 10 is in a low-speed and low-load range, the air-fuel ratio change cycle and the air-fuel ratio change amplitude are set to greater values. Alternatively, when the engine 10 is in a high-speed and high-load range, the air-fuel ratio change cycle and the air-fuel ratio change amplitude are set to smaller values. Usually, when the engine 10 is operating in the low-speed and low-load range, it means that the flow rate and flow velocity of exhaust gas emitted from the engine 10 are smaller, so that the response time required for the air-fuel ratio sensor 32 to respond to a change in the exhaust gas is longer. Conversely, when the engine 10 is operating in the high-speed and high-load range, it means that the flow rate and flow velocity of the exhaust gas are greater, so that the response time required for the air-fuel ratio sensor 32 to respond to a change the exhaust gas) is shorter. The selection of the air-fuel ratio change cycle and the air-fuel ratio change amplitude, like in FIG. 16, therefore, establishes constant response rates of the air-fuel ratio sensor 32 at rich and lean mixtures regardless of the operating conditions of the engine 10. The air-fuel ratio change cycle and the air-fuel ratio change amplitude may alternatively be determined mathematically. Only either one of them may be determined variably.

After step 803, the routine proceeds to step 804 wherein an air-fuel ratio enriching flag is checked to determine whether the current air-fuel ratio is changing to the rich side or to the lean side. If the air-fuel ratio enriching flag shows one (1) meaning that the air-fuel ratio is changing to the rich side, then the routine proceeds to step 805 wherein the value by which the air-fuel ratio is to be changed intentionally (will be referred to as an intentionally changed AF amplitude below) is subtracted from a basic target air-fuel ratio (i.e., an initially set target air-fuel ratio) to determine a target air-fuel ratio, and the air-fuel ratio enriching flag is cleared to zero (0). Alternatively, if the air-fuel ratio enriching flag shows zero (0) meaning that the air-fuel ratio is changing to the lean side, then the routine proceeds to step 806 wherein the intentionally changed AF amplitude is added to the basic target air-fuel ratio to determine a target air-fuel ratio, and the air-fuel ratio enriching flag is set to one (1).

The determination in step 804 of whether the air-fuel ratio is being enriched or not may alternatively be made by directly checking an instantaneous value of the target air-fuel ratio or a count of a cycle counter that counts a cycle in which the air-fuel ratio changes from rich to lean and/or from lean to rich. For instance, the cycle counter is designed to count up at a regular intervals. When the count reaches twenty (20), the air-fuel ratio is switched to rich. Subsequently, when the count reaches next twenty (20), the air-fuel ratio is switched to lean.

Figure 12:
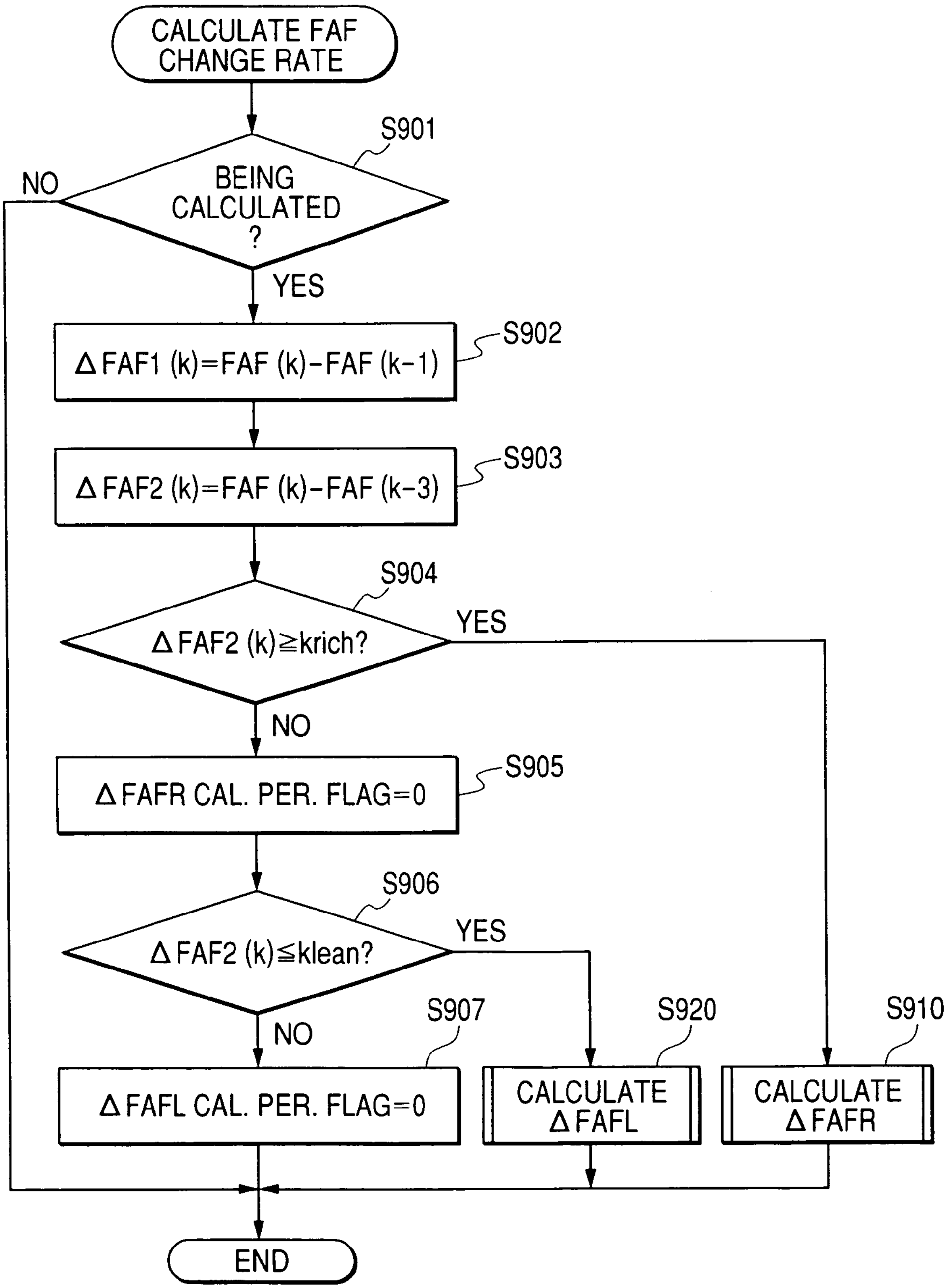
FIG. 12 is a flowchart of a program to determine a rate of change in air-fuel ratio correction factor.

After entering step 730, the routine proceeds to the program of FIG. 12 to calculate a rate (i.e., velocity) of change in the air-fuel ratio correction factor FAF.

First, in step 901, it is determined whether the air-fuel ratio correction factor FAF is now being calculated or not. If a NO answer is obtained meaning that the air-fuel ratio correction factor FAF is not being calculated, then the routine terminates. Alternatively, if a YES answer is obtained, then the routine proceeds to step 902 wherein a first correction factor change ΔFAF1 is determined that is the value FAF(k) of the air-fuel ratio correction factor FAF, as having been determined in this program cycle, minus the value FAF(k−1) of the air-fuel ratio correction factor FAF, as determined one program cycle earlier. The routine proceeds to step 903 wherein a second correction factor change a correction factor change ΔFAF1 is determined that is the value FAF(k) of the air-fuel ratio correction factor FAF, as having been determined in this program cycle, minus the value FAF(k−3) of the air-fuel ratio correction factor FAF, as determined three program cycles earlier. Note that the second correction factor change ΔFAF2 may alternatively be determined as a difference between the value FAF(k) of the air-fuel ratio correction factor FAF, as having been determined in this program cycle, and the value FAF(k−2) or the value FAF(k−4) of the air-fuel ratio correction factor FAF, as determined two or four program cycles earlier. Specifically, the cycle in which the second correction factor change ΔFAF2 is determined may be changed depending upon the type of the engine.

After step 903, the routine proceeds to step 904 wherein it is determined whether the second air-fuel ratio correction factor change ΔFAF2 is greater than a predetermined rich criterion krich or not. If a NO answer is obtained (i.e., ΔFAF2<krich), then the routine proceeds to step 905 wherein a ΔFAFR calculation permissible flag is cleared to zero (0). The routine proceeds to step 906 wherein it is determined whether the second air-fuel ratio correction factor change ΔFAF2 is smaller than or equal to a predetermined lean criterion klean or not. If a NO answer is obtained (i.e., ΔFAF2>klean), then the routine proceeds to step 907 wherein the ΔFAFL calculation permissible flag is cleared to zero (0) and terminates. Note that the ΔFAFR calculation permissible flag, as used in step 905, is a flag for permitting the correction factor change rate ΔFAFR upon a change in the air-fuel ratio to the rich side to be determined, and the ΔFAFL calculation permissible flag, as used in step 907, is a flag for permitting the correction factor change rate ΔFAFL upon a change in the air-fuel ratio to the lean side to be determined. When the ΔFAFR calculation permissible flag and the ΔFAFL calculation permissible flag are one (1), it allows the correction factor change rates ΔFAFR and ΔFAFL to be determined, respectively, while they are zero (0), such determinations are prohibited. Specifically, when the amount of change in the air-fuel ratio correction factor FAF within a given period of time lies within a specified range (i.e., klean<ΔFAF2<krich), the rich side correction factor change rate ΔFAFR and the lean side correction factor change rate ΔFAFL are both prohibited from being determined.

Figure 13:
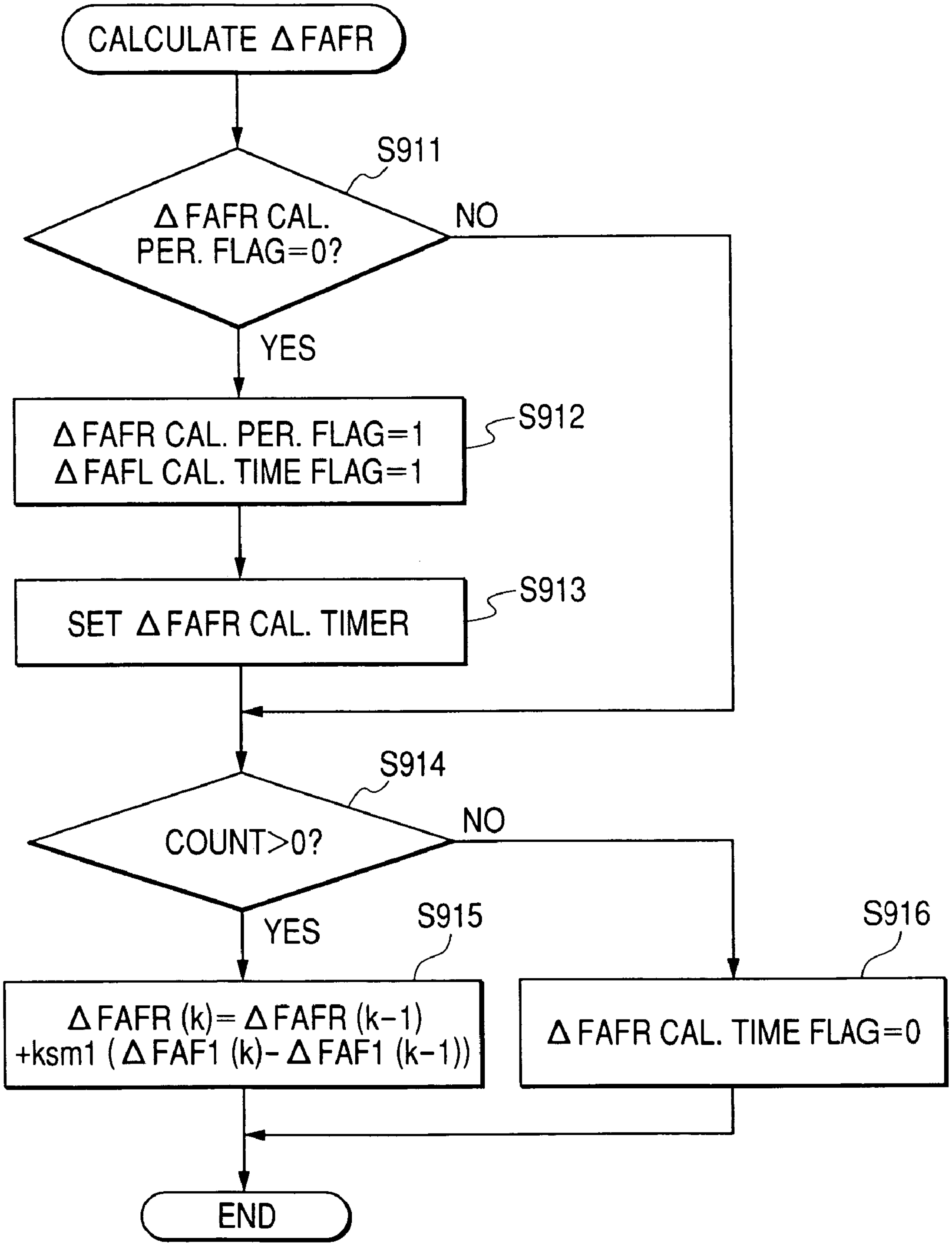
FIG. 13 is a flowchart of a program to calculate a rate of change in air-fuel ratio correction factor at a rich mixture.
Figure 14:
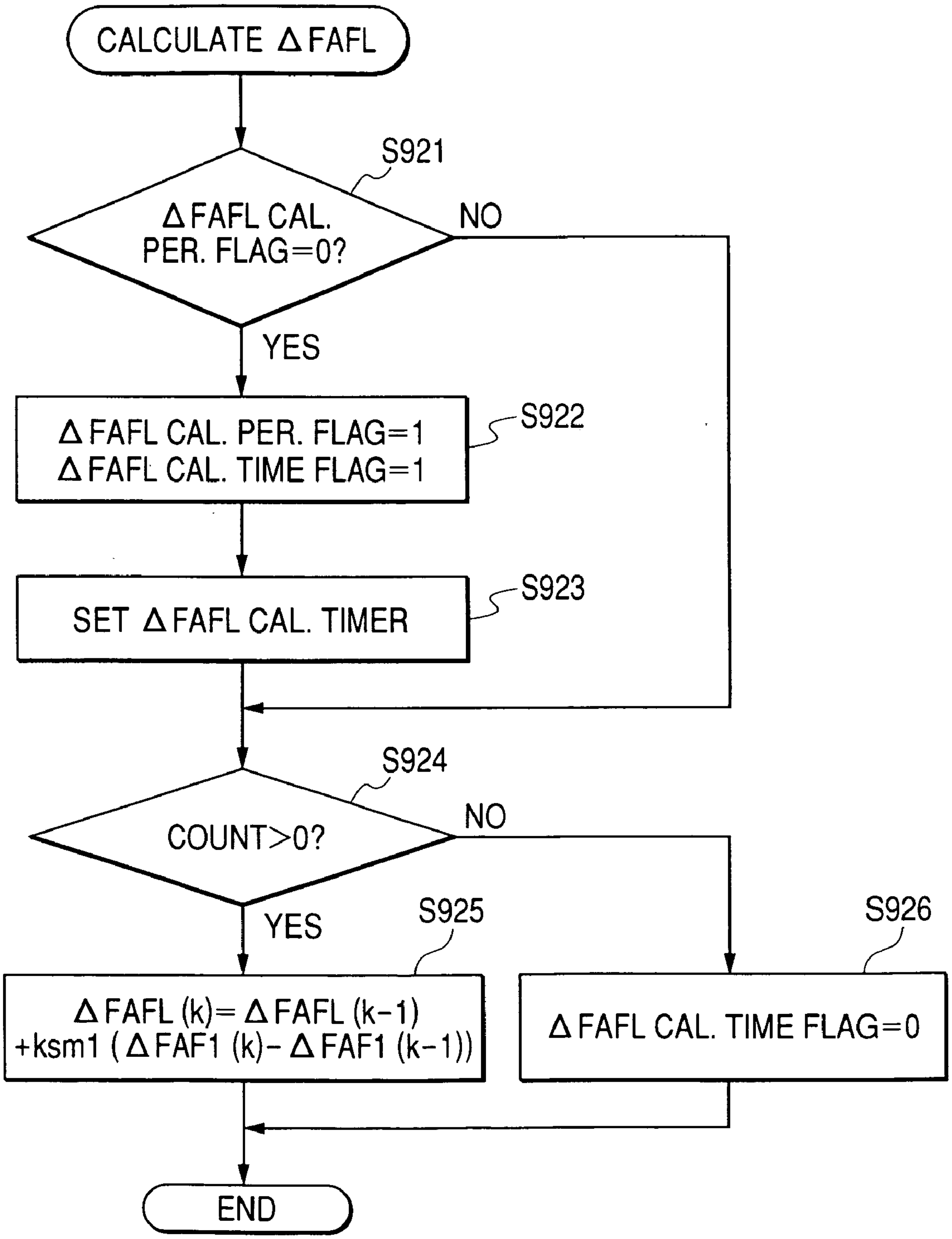
FIG. 14 is a flowchart of a program to calculate a rate of change in air-fuel ratio correction factor at a lean mixture.

If a YES answer is obtained in step 904 (i.e., ΔFAF2≧krich), then the routine proceeds to step 910 wherein the rich side correction factor change rate ΔFAFR is calculated according to a sub-program, as illustrated in FIG. 13. If a YES answer is obtained in step 906 (i.e., ΔFAF2<klean), then the routine proceeds to step 920 wherein the lean side correction factor change rate ΔFAFL is calculated according to a sub-program, as illustrated in FIG. 14.

In FIG. 13, it is determined in step 911 wherein it is determined whether the ΔFAFR calculation permissible flag is zero (0) or not. If a YES answer is obtained, then the routine proceeds to step 912 wherein the ΔFAFR calculation permissible flag is set to one (1), and a ΔFAFR calculation time flag is set to one (1). The routine proceeds to step 913 wherein a count value of a ΔFAFR calculation timer is reset to a predetermined initial value. Specifically, when, after a condition of ΔFAF2≧krich is encountered, step 910 is entered for the first time where the ΔFAFR calculation permissible flag is zero (0), the operations in step 912 are carried out. Note that the ΔFAFR calculation timer is designed to be decremented at given time intervals after being reset to the initial value in step 913.

After step 913, the routine proceeds to step 914 wherein it is determined whether the count value of the ΔFAFR calculation timer is greater than zero (0) or not. If YES answer is obtained, then the routine proceeds to step 915 wherein the rich side correction factor change rate ΔFAFR is determined according to the following equation:

$$\Delta FAFR(k)=\Delta FAFR(k-1)+ksm1(\Delta FAF1(k)-\Delta FAF1(k-1))$$

where ksm1 is a smoothing gain.

If a NO answer is obtained in step 914 meaning that the count value of the ΔFAFR calculation timer is smaller than or equal to zero (0), then the routine proceeds to step 916 wherein the ΔFAFR calculation time flag is cleared to zero (0). Specifically, after the count value of the ΔFAFR calculation timer reaches zero (0), the rich side correction factor change rate ΔFAFR is prohibited from being calculated.

In FIG. 14, it is determined in step 921 wherein it is determined whether the ΔFAFL calculation permissible flag is zero (0) or not. If a YES answer is obtained, then the routine proceeds to step 922 wherein the ΔFAFR calculation permissible flag is set to one (1), and a ΔFAFL calculation time flag is set to one (1). The routine proceeds to step 923 wherein a count value of a ΔFAFL calculation timer is reset to a predetermined initial value. Specifically, when, after a condition of ΔFAF2≧klean is encountered, step 920 is entered for the first time where the ΔFAFL calculation permissible flag is zero (0), the operations in step 922 are carried out. Note that the ΔFAFR calculation timer is designed to be decremented at given time intervals after being reset to the initial value in step 923.

After step 923, the routine proceeds to step 924 wherein it is determined whether the count value of the ΔFAFL calculation timer is greater than zero (0) or not. If YES answer is obtained, then the routine proceeds to step 925 wherein the lean side correction factor change rate ΔFAFL is determined according to the following equation:

$$\Delta FAFL(k)=\Delta FAFL(k-1)+ksm1(\Delta FAF1(k)-\Delta FAF1(k-1)$$

If a NO answer is obtained in step 924 meaning that the count value of the ΔFAFL calculation timer is smaller than or equal to zero (0), then the routine proceeds to step 926 wherein the ΔFAFL calculation time flag is cleared to zero (0). Specifically, after the count value of the ΔFAFL calculation timer reaches zero (0), the lean side correction factor change rate ΔFAFL is prohibited from being calculated.

Figure 17:
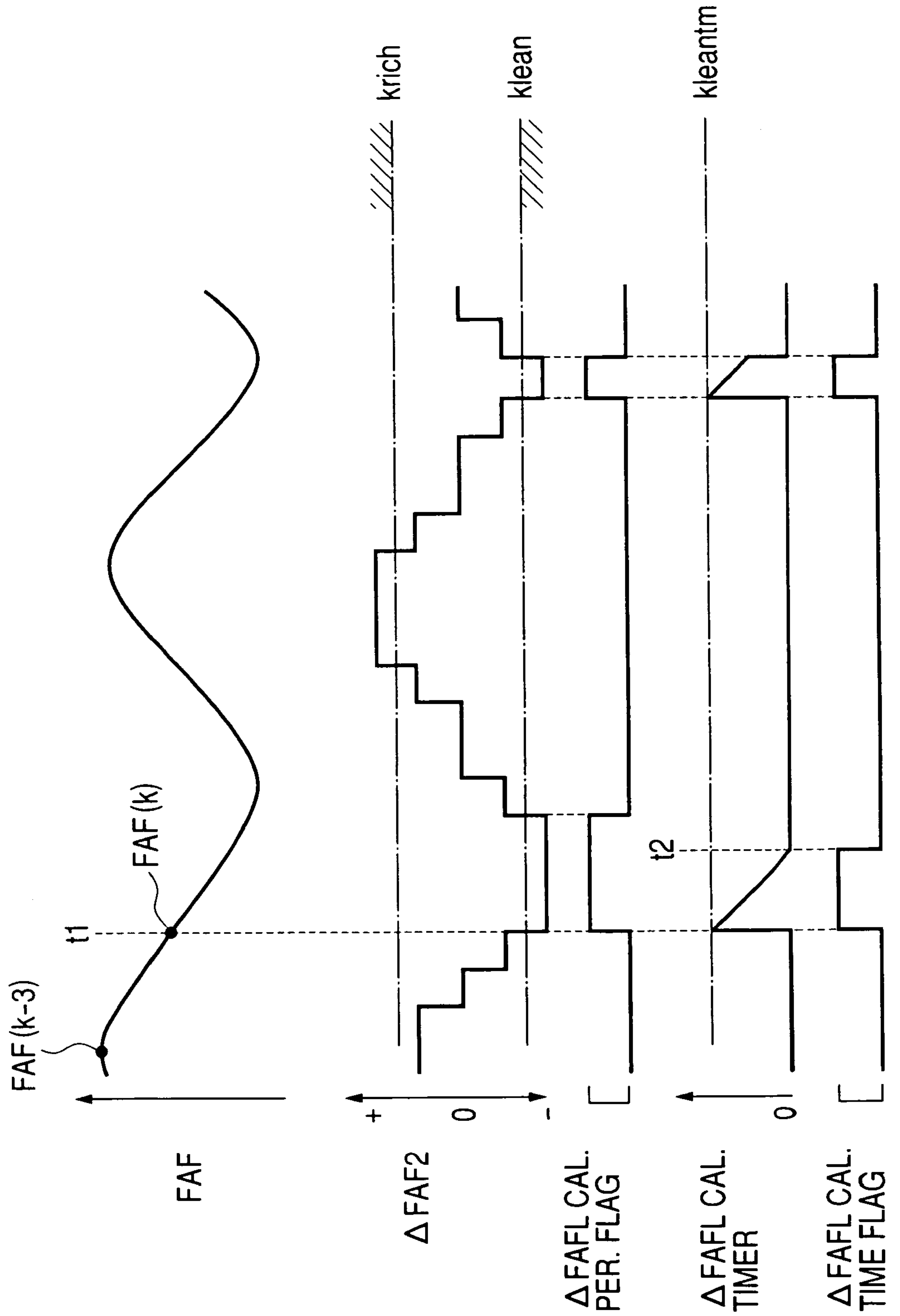
FIG. 17 is a time chart for explaining steps of determining a period of time within which a rate of change in air-fuel ratio correction factor is allowed to be calculated.

The operations, as illustrated in FIGS. 12 to 14, to determine the rich and lean side correction factor changes rate ΔFAFR and ΔFAFR will be described below with reference to a timechart in FIG. 17. Note that the timechart of FIG. 17 refers only to when the air-fuel ratio is changed to the lean side for the brevity of disclosure.

At time t1, the second the second correction factor change ΔFAF2(FAF(k)−FAF(k−3)) drops below the lean side criterion klean. The ΔFAFR calculation permissible flag and the ΔFAFL calculation time flag are set to one (1) (step 922). Simultaneously, the count value of the ΔFAFR calculation timer is reset to a predetermined initial value kleantm (step 923). After time t1, the value kleantim is decremented sequentially. When the count value of the ΔFAFR calculation timer reaches zero (0) at time t2, the ΔFAFL calculation time flag is cleared to zero (0). This terminates the calculation of the lean side correction factor change rate ΔFAFL. Specifically, after the air-fuel ratio correction factor FAF is changed by a given amount, the lean side correction factor change rate ΔFAFL starts to be calculated. The period of time within which the lean side correction factor change rate ΔFAFL is allowed to be calculated is set by the count value of the ΔFAFL calculation timer. Usually, a time lag occurs between a change in the exhaust gas atmosphere and a resulting change in output of the air-fuel ratio sensor 32. The ΔFAFL calculation timer works to limit the above ΔFAFL calculation permissible time to a specified time within which the air-fuel ratio correction factor change rates ΔFAFL and ΔFAFR are sensitive to the deterioration of reactive characteristics of the air-fuel ratio sensor 32. Thus, even if the air-fuel ratio sensor 32 is deteriorating in the reactive characteristics, but behaves as normal, the desired accuracy of detecting the reactive characteristics of the air-fuel ratio sensor 32 is ensured. The same applies to the case where the air-fuel ratio correction factor FAF is changing in a cycle different from that of the air-fuel ratio (i.e., hunting).

Figure 15:
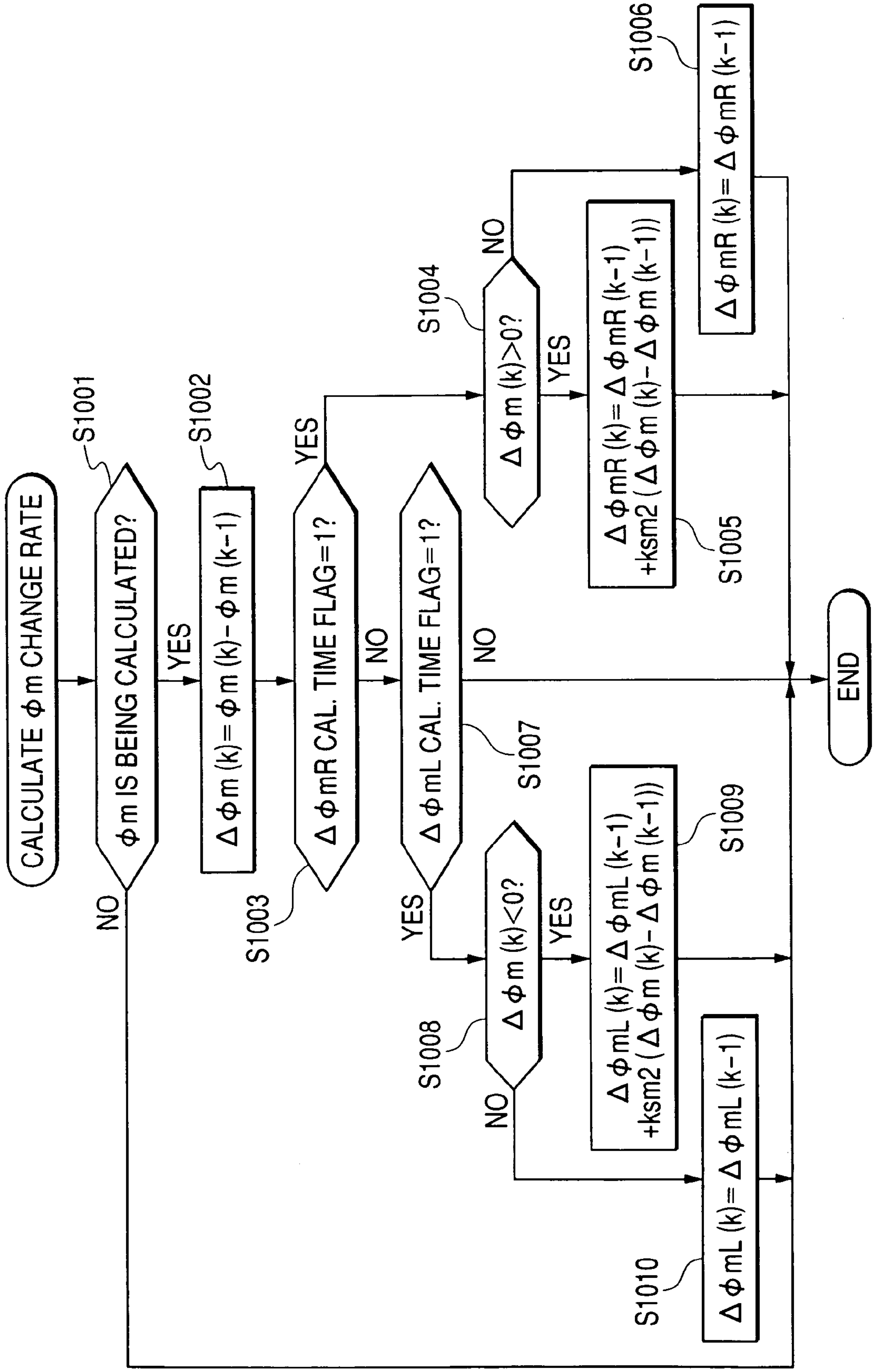
FIG. 15 is a flowchart of a program to determine a rate of change in corrected air-fuel ratio.

After step 730 in FIG. 10, the routine enters a subprogram, as illustrated in FIG. 15.

First, in step 1001, it is determined whether the corrected air-fuel ratio ϕm is now being calculated or not. If a NO answer is obtained, then the routine terminates. Alternatively, if a YES answer is obtained, then the routine proceeds to step 1002 wherein the corrected air-fuel ratio change Δϕm is determined that is the value ϕm(k) of the corrected air-fuel ratio ϕm, as having been determined in this program cycle, minus the value ϕm(k−1) of the corrected air-fuel ratio ϕm, as determined one program cycle earlier. The routine proceeds to step 1003 wherein it is determined whether a ΔϕmR calculation time flag is one (1) or not. If a YES answer is obtained, then the routine proceeds to step 1004. Note that the ΔϕmR calculation time flag is changed upon setting or resetting of the ΔFAFR calculation time flag, as described above, and will be described in detail later. The same is true for a ΔϕmL calculation time flag, as described later.

In step 1004, it is determined whether the corrected air-fuel ratio change a Δϕm is greater than zero (0) or not. The fact that the corrected air-fuel ratio change a Δϕm is greater than zero (0) means that an excess fuel increases to enrich the air-fuel ratio. If a YES answer is obtained, then the routine proceeds to step 1005 wherein the rich side correction air-fuel ratio change rate a ΔϕmR is determined according to the following equation:

$$\Delta\phi mR(k)=\Delta\phi mR(k-1)+ksm2(\Delta\phi m(k)-\Delta\phi m(k-1)$$

where ksm2 is a smoothing gain.

If a NO answer is obtained in step 1004 (i.e., Δϕm≦0), then the routine proceeds to step 1006 wherein the rich side correction air-fuel ratio change rate ΔϕmR is determined according to a relation of ΔϕmR(k)=ΔϕmR(k−1). Specifically, when the ΔϕmR calculation time flag shows one (1), but the corrected air-fuel ratio ϕm is changing toward the lean side, noise or temporal variation in combustion condition of the engine 10 may result in a variation in the correction air-fuel ratio ϕm. In order to eliminate any effects of such a variation in the correction air-fuel ratio ϕm, step 1006 sets the value of the rich side correction air-fuel ratio change rate ΔϕmR, as derived one program cycle earlier, as the current one.

If a NO answer is obtained in step 1003, then the routine proceeds to step 1007 wherein it is determined whether a ΔϕmL calculation time flag is one (1) or not. If a NO answer is obtained, then the routine terminates. Alternatively, if a YES answer is obtained, then the routine proceeds to step 1008 wherein it is determined whether the corrected air-fuel ratio change Δϕm is smaller than zero (0) or not. The fact that the corrected air-fuel ratio change Δϕm is smaller than zero (0) means that an excess fuel decreases to change the air-fuel ratio toward the lean side. If a YES answer is obtained, then the routine proceeds to step 1009 wherein the lean side correction air-fuel ratio change rate ΔϕmL is determined according to the following equation:

$$\Delta\phi mL(k)=\Delta\phi mL(k-1)+ksm2(\Delta\phi m(k)-\Delta\phi m(k-1)$$

If a NO answer is obtained in step 1008 (i.e., Δϕm≧0), then the routine proceeds to step 1010 wherein the lean side correction air-fuel ratio change rate ΔϕmL is determined according to a relation of a ΔϕmL(k)=ΔϕmL(k−1). Specifically, when the ΔϕmL calculation time flag shows one (1), but the corrected air-fuel ratio ϕm is changing toward the rich side, noise or temporal variation in combustion condition of the engine 10 may result in a variation in the correction air-fuel ratio ϕm. In order to eliminate any effects of such a variation in the correction air-fuel ratio ϕm, step 1010 sets the value of the lean side correction air-fuel ratio change rate a ΔϕmL, as derived one program cycle earlier, as the current one.

Figure 18:
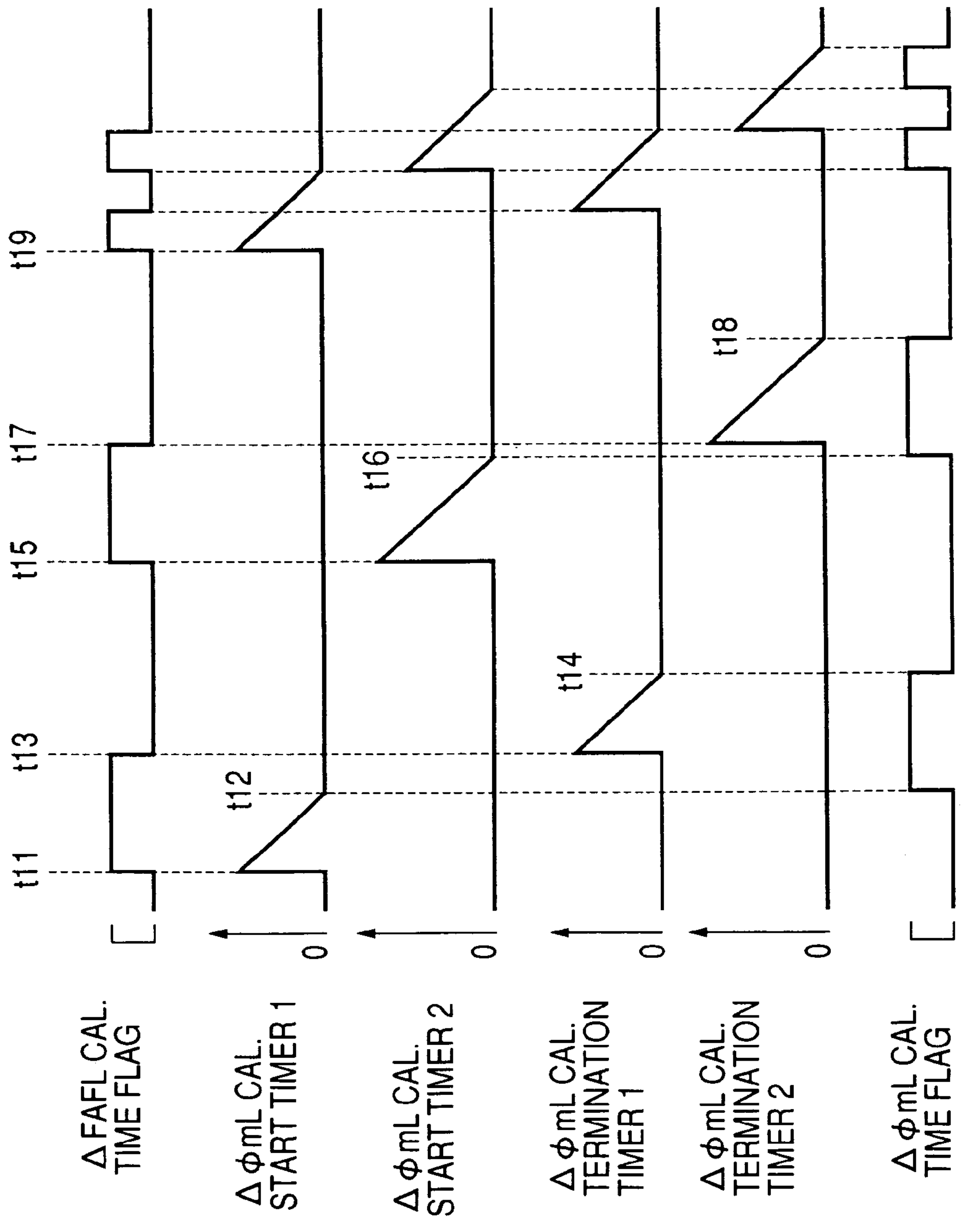
FIG. 18 is a time chart for explaining steps of determining a period of time within which a rate of change in air-fuel ratio, as detected by an air-fuel ratio sensor is allowed to be calculated.

The operation in FIG. 15 to set the ΔϕmL calculation time flag will be described with reference to a time chart of FIG. 18. The ΔϕmR calculation time flag is set in the same manner, and explanation there of in detail will be omitted here.

Between times t11 and t13 and between times t15 and t17, the ΔFAFL calculation time flag is set to one (1). A ΔϕmL calculation start timer No. 1 is reset to a given value when the ΔFAFL calculation time flag is set to one (1) at time t11 to initiate the calculation of the corrected air-fuel ratio change rate ΔFAFL for the first time. When the ΔFAFL calculation time flag is reset to zero (0) at time t13, a ΔϕmL calculation termination timer No. 1 is reset to a given value. When the count value of the ΔϕmL calculation start timer No. 1 is decremented and has reached zero (0) at time t12, the ΔϕmL calculation time flag is set to one (1). When the count value of the ΔϕmL calculation termination timer No. 1 is decremented and has reached zero (0) at time t14, the ΔϕmL calculation time flag is reset to zero (0). Specifically, the duration (t12-t14) within which the ΔϕmL calculation time flag shows one (1) is a period of time the corrected air-fuel ratio change rate ΔϕmL is calculated which begins a given time after the beginning of the ΔFAFL calculation time (t11-t13).

Within the second ΔFAFL calculation time (t15-t17), the same operation as that within the first FAFL calculation time (t11-t13) except use of a ΔϕmL calculation start timer No. 2 and a ΔϕmL calculation termination timer No. 2. Specifically, the ΔϕmL calculation time flag is kept set to one (1) between times t16 to t18 during which the corrected air-fuel ratio change rate ΔϕmL is calculated. The use of two pairs of the ΔϕmL calculation start timers No. 1 and No. 2 and the ΔϕmL calculation termination timers No. 1 and No. 2 ensures the stability in setting he ΔϕmL calculation time flag to one (1) (see time t19 or later) even if the ΔFAFL calculation time flag is checked before the count values of the above timers reach zero (0). Only one pair of the ΔϕmL calculation start timer and the ΔϕmL calculation termination timer may alternatively be used.

The times set in the ΔϕmL calculation start timers No. 1 and No. 2 and the ΔϕmL calculation termination timers No. 1 and No. 2 are identical with a lag time between the calculation of change data on the air-fuel ratio correction factor FAF and the calculation of change data on the corrected air-fuel ratio ϕm. It is advisable that the timer set times be determined as a function of a lag time between a change in amount of fuel injected into the engine 10 and a resulting change in gas atmosphere around the air-fuel ratio sensor 32. For instance, the timer set times may be selected by look-up using a map or calculated based on an mathematical equation which is experimentally prepared in terms of engine operating parameters such as an engine speed and an engine load. However, the timer set times may be fixed if the time the timers are to be started are limited to within a specified engine speed range.

As apparent from the above discussion, the air-fuel ratio monitor of this embodiment works to allow the change data on the corrected air-fuel ratio ϕm (i.e., ΔϕmR and ΔϕmL) and the change data on the air-fuel ratio correction factor FAF (i.e., ΔFAFR and ΔFAFL) to be calculated only when a change in the air-fuel ratio correction factor FAF (i.e., ΔFAF2) to the rich or lean side exceeds a specified value. In other words, the above change data are allowed to be derived only in a condition where the deterioration of reactive characteristics of the air-fuel ratio sensor 32 appears clearly, thereby resulting in improved accuracy of detecting such a deterioration of the air-fuel ratio sensor 32.

Additionally, the air-fuel ratio detecting device works to calculate the change data on the corrected air-fuel ratio ϕm (i.e., ΔϕmR and ΔϕmL) with a given time lag after the change data on the air-fuel ratio correction factor FAF (i.e., ΔFAFR and ΔFAFL) is allowed to be calculated, thus ensuring the accuracy of detecting the deterioration of reactive characteristics of the air-fuel ratio sensor 32 even if the air-fuel ratio sensor 32 experiences a response lag time.

The air-fuel ratio detecting device of the above embodiments may alternatively be designed to detect the reactive characteristics of the air-fuel ratio sensor 32 only using the AFR change rate-to-AFR correction factor change rate ratio compR and the AFR change rate-to-AFR correction factor change rate ratio compL, as derived in step 401 of FIG. 6, without use of the response parameter α, as determined so as to eliminate a difference between responses of the air-fuel ratio sensor 32 on the rich and lean sides.

The air-fuel ratio detecting device may also be designed to detect the reactive characteristics on the rich and lean sides of the air-fuel ratio independently. For instance, if a YES answer is obtained in step 602 of FIG. 8, it may be determined that the air-fuel ratio sensor 32 has undergone the deterioration of reactive characteristic on the rich side of the air-fuel ratio. If a YES answer is obtained in step 603, it may be determined that the air-fuel ratio sensor 32 has undergone the deterioration of reactive characteristic on the lean side of the air-fuel ratio. Further, if the ratio compRL is greater than the value K3 or smaller than the reference value K4, it may be determined that the air-fuel ratio sensor 32 has undergone the deterioration of reactive characteristic on the rich side or lean side.

Instead of the corrected air-fuel ratio change rates ΔϕmR and ΔϕmL and the air-fuel ratio correction factor change rates ΔFAFR and ΔFAFL, as used as the change data on the detected air-fuel ratios and the air-fuel ratio correction factors on the rich and lean sides, accelerations at which the corrected air-fuel ratio changes and the air-fuel ratio correction factor changes may be employed.

The response detector M4 of the ECU 40 may alternatively be designed to determine the change data on the air-fuel ratio, as detected by the air-fuel ratio sensor 32, using the air-fuel ratio ϕsig directly in place of the corrected air-fuel ratio ϕm.

The detected air-fuel ratio ϕsig is advanced in phase upon a change in air-fuel ratio to the lean side to derive the corrected air-fuel ratio ϕm, but however, it may alternatively be retarded in phase upon a change in air-fuel ratio to the rich side to determine the corrected air-fuel ratio ϕm. The correction of the detected air-fuel ratio ϕsig may alternatively be made by multiplying the detected air-fuel ratio ϕsig by a preselected gain.

The reference values K1 to K5, as used in FIG. 8 as the threshold values for determining the failure of the air-fuel ratio sensor 32, may be selected based on initial response characteristics of the air-fuel ratio sensor 32. This enables a change in the response characteristics to be monitored since the air-fuel ratio sensor 32 is in an original state.

The air-fuel ratio detecting device in the first embodiment may alternatively be designed to change the air-fuel ratio intentionally in a cycle to detect the response characteristics of the air-fuel ratio sensor 32 and the deterioration thereof during the change in the air-fuel ratio. Such intentionally changing of the air-fuel ratio may be accomplished with the operation in FIG. 11 in the second embodiment or the air-fuel ratio dither control used for the purpose of activating the catalytic converter early at a cold start of the engine or improving the emission control efficiency (i.e. recovering the function) of the catalytic converter after warm-up of the engine 10. For instance, the air-fuel ratio is changed intentionally from rich to lean and from lean to rich at several Hz. Resulting changes in the detected air-fuel ratio ϕsig and the air-fuel ratio correction factor FAF are monitored to detect the failure of the air-fuel ratio sensor 32. This enables the above change data to be derived sufficiently on the rich and lean sides of the air-fuel ratio, thus increasing the reliability of the sensor failure detection.

Figure 19A:
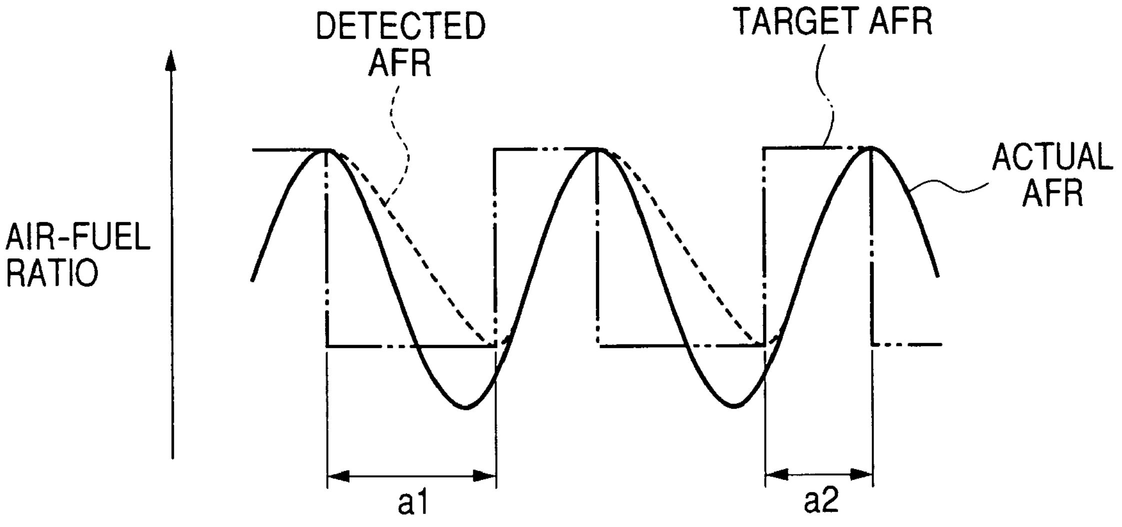
FIGS. 19(*a*) and 19(*b*) are time charts which show intentional change in air-fuel ratio when an air-fuel ratio sensor is failing in a modified form of the second embodiment.
Figure 19B:
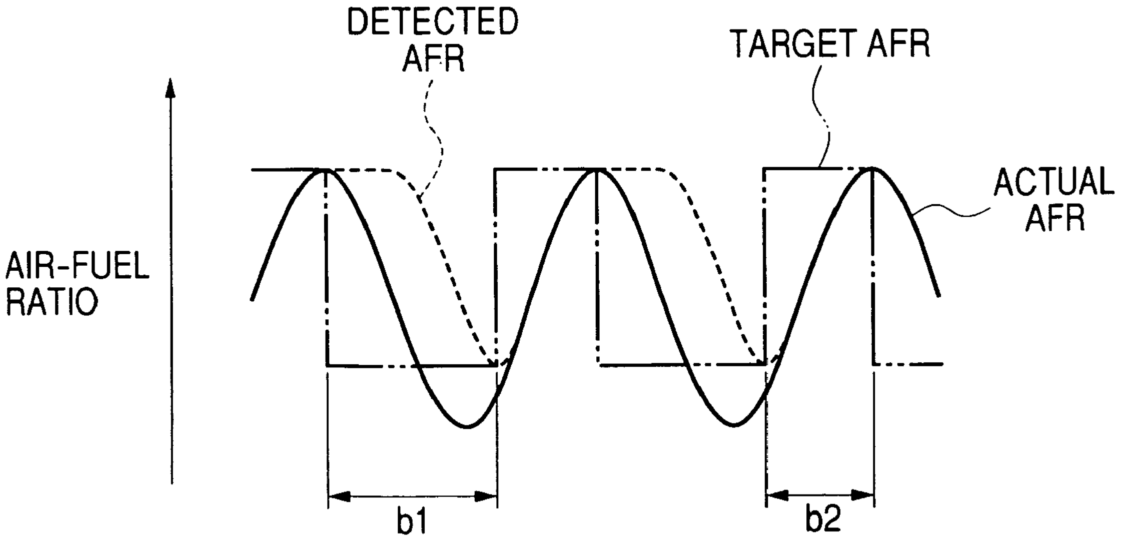

The intentionally changing of the air-fuel ratio may also be accomplished by switching between a rich side target air-fuel ratio and a lean side target air-fuel ratio each time the detected air-fuel ratio ϕsig reaches either of the target air-fuel ratios. For instance, the target air-fuel ratio is, as shown in FIGS. 19(*a*) and 19(*b*), changed cyclically. A solid line indicates an actual air-fuel ratio. A broken line indicates the detected air-fuel ratio ϕsig (an overlap with the actual air-fuel ratio is expressed by a solid line). A chain double-dashed line indicates the target air-fuel ratio. FIG. 19(*a*) illustrates an output of the air-fuel ratio sensor 32 in a case where the response characteristics of the air-fuel ratio sensor 32 are deteriorated, which output is similar to a smoothed output of the air-fuel ratio sensor 32. FIG. 19(*b*) illustrates an output of the air-fuel ratio sensor 32 in a case where it is failing which results in an increased lag time between a change in gas atmosphere around the air-fuel ratio sensor 32 and a resulting change in output of the air-fuel ratio sensor 32. FIGS. 19(*a*) and 19(*b*) both show for the case where the air-fuel ratio sensor 32 is failing when the air-fuel ratio is on the lean side for the brevity of disclosure.

In FIGS. 19(*a*) and 19(*b*), a1 and b1 indicate a period of time during which the deterioration of the response characteristics of the air-fuel ratio sensor 32 appears, and a2 and b2 indicate a period of time during which the air-fuel ratio sensor 32 is operating properly. The detection of the deterioration of response characteristics of the air-fuel ratio sensor 32 is achieved by comparing the parameters between the period of times a1 and b1 and between the period of times a2 and b2. Note that in the case where the target air-fuel ratio is switched each time the detected air-fuel ratio ϕsig coincides with the target air-fuel ratio, desired variations in the air-fuel ratio in a minimum cycle may be achieved both on the rich and lean sides.

The failure of the air-fuel ratio sensor 32 may also be detected only using the change data on the detected air-fuel ratio ϕsig without use of the change data on the air-fuel ratio correction factor FAF. Particularly, in the case where the air-fuel ratio is changed intentionally, as described above, it is possible to know the amount of change in the air-fuel ratio in advance, thus allowing only the change data on the detected air-fuel ratio ϕsig to be used to detect the failure of the air-fuel ratio sensor 32 effectively. As the change data on the detected air-fuel ratio ϕsig, the rate or acceleration of change in the detected air-fuel ratio ϕsig per unit time may be employed.

In the second embodiment, the first and second correction factor changes ΔFAF1 and ΔFAF2 are determined as the change data on the air-fuel ratio correction factor FAF, but only one of them may be employed. In this case, either one of the first and second correction factor changes ΔFAF1 and ΔFAF2 is used in steps 904 and 906 of FIG. 12 to check the change in the fir-fuel ratio correction factor FAF, step 915 of FIG. 13 to determine the correction factor change rate ΔFAFR, and step 925 of FIG. 14 to determine the correction factor change rate ΔFAFL.

In the second embodiment, two flags (i.e., the ΔFAFL calculation permissible flag and the ΔFAF2 calculation time flag) are set when the rate of change in the air-fuel ratio correction factor (i.e., the lean side correction factor change rate ΔFAFL) is determined. The two flags may be combined together. The same may apply to the calculation of the rich side correction factor change rate ΔFAFR.

The failure of the air-fuel ratio sensor 32 may be detected by determining parameters such as the change data on the detected air-fuel ratio ϕsig and the change data on the air-fuel ratio correction factor FAF sequentially or only immediately before the failure is to be detected.

The air-fuel ratio detecting device may alternatively be designed to monitor the deterioration of the response characteristics (i.e., the reactive characteristics) of the air-fuel ratio sensor 32 and use it only in correcting the detected air-fuel ratio ϕsig or in the air-fuel ratio control.

The above described modifications may also be used in the following embodiments.

Figure 20:
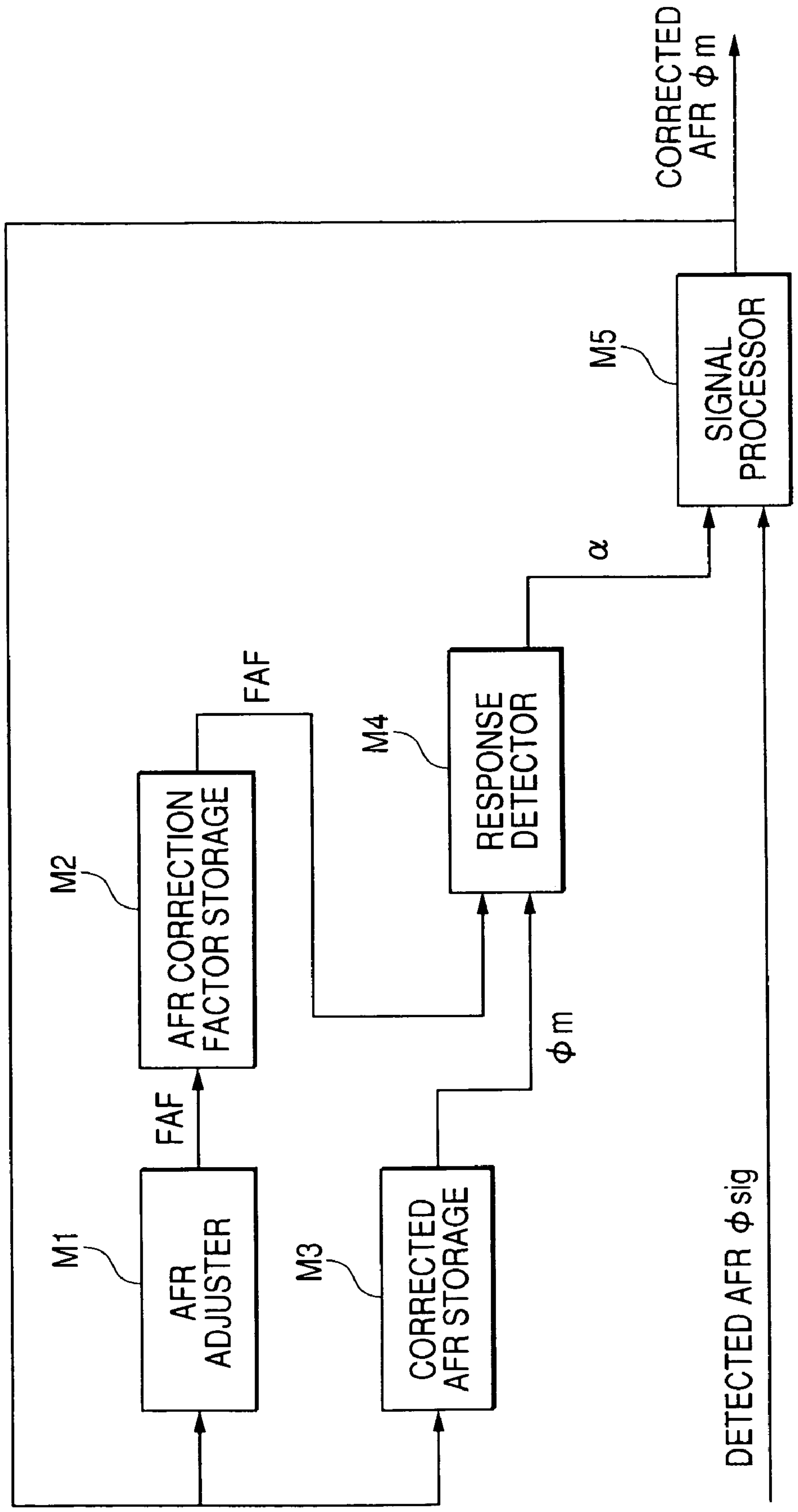
FIG. 20 is a block diagram which shows an air-fuel ratio detecting device according to the second embodiment of the invention.

FIG. 20 shows an air-fuel ratio detecting device according to the third embodiment of the invention which is different in structure from that in the first embodiment only in that it does not include the sensor failure detector M6. The same reference numbers as employed in the above embodiments will refer to the same parts, and explanation thereof in detail will be omitted here.

Specifically, the air-fuel ratio detecting device of this embodiment is designed for the purpose of increasing the accuracy of determining the air-fuel ratio of a mixture to the engine 10 and, as clearly shown in FIG. 20, consists of the air-fuel ratio adjusting circuit M1, the air-fuel ratio correction factor storage M2, the corrected air-fuel ratio storage M3, the response detector M4, and the air-fuel ratio sensor signal processing circuit M5. The operations of these blocks are the same as those in the first embodiment.

The air-fuel ratio detecting device works to correct the air-fuel ratio, as detected by the air-fuel ratio sensor 32, as a function of response characteristics of the air-fuel ratio sensor 32 when the air-fuel ratio is changed to the rich and lean sides.

Figure 21A:
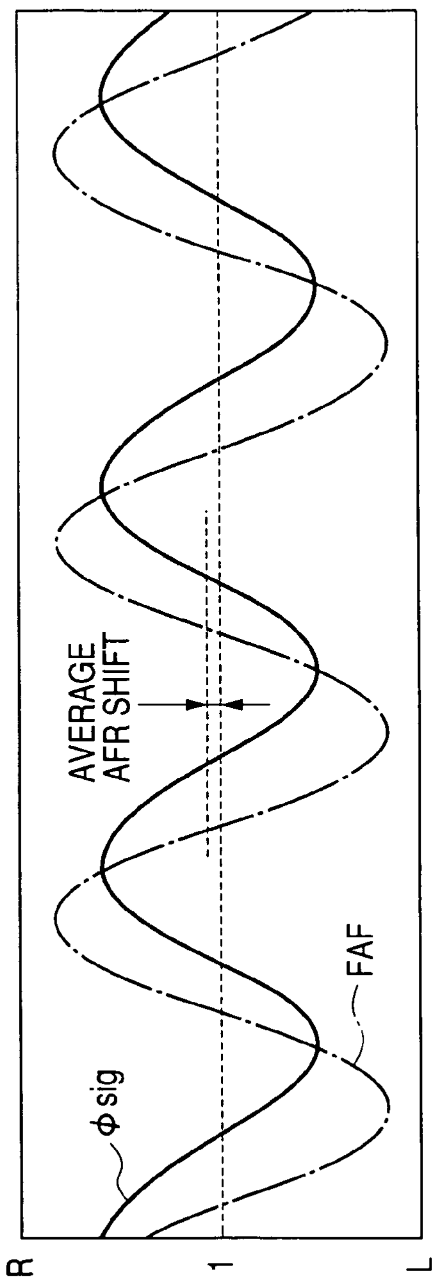
FIGS. 21(*a*) and 21(*b*) are time chart which show changes in air-fuel ratio and an air-fuel ratio correction factor.
Figure 21B:
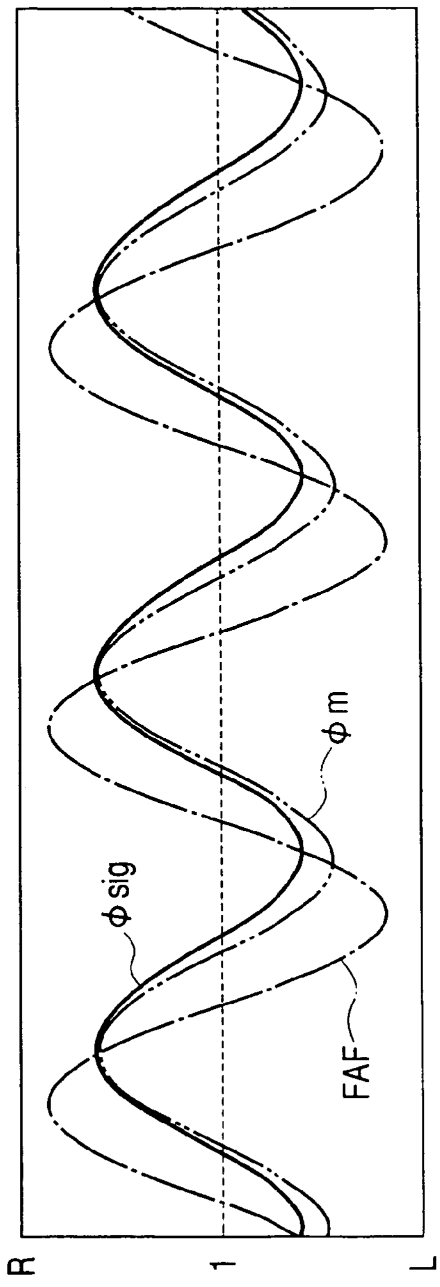

FIGS. 21(*a*) and 21(*b*) are time charts which show changes in the detected air-fuel ratio ϕsig, the air-fuel ratio correction factor FAF, and the corrected air-fuel ratio ϕm. A dashed line indicates the air-fuel ratio correction factor FAF. A solid line indicates the detected air-fuel ratio ϕsig. A chain double-dashed line indicates the corrected air-fuel ratio ϕm. In the illustrated examples, the stoichiometric ratio, as expressed by one (1) on a vertical axis, is defined as a target air-fuel ratio.

When the air-fuel ratio ϕsig, as detected by the air-fuel ratio sensor 32, changes, as illustrated in FIG. 21(*a*), from rich to lean and from lean to rich, it will cause the air-fuel ratio correction factor FAF to change as a function of the change in the air-fuel ratio ϕsig. In the example of FIG. 21(*a*), the detected air-fuel ratio ϕsig is shifted to the rich side as a whole, so that an average of the detected air-fuel ratio ϕsig is offset from the stoichiometric ratio by an average AFR shift, as indicated by arrows. This would be because the air-fuel ratio sensor 32 is responsive to a change in the air-fuel ratio to the rich side more highly than to the lean side.

The air-fuel ratio detecting device of this embodiment works to, as shown in FIG. 21(*b*), advance the phase of the detected air-fuel ratio ϕsig when being changed to the lean side to produce the corrected air-fuel ratio ϕm whose average coincides with the stoichiometric ratio. The engine control system uses the corrected air-fuel ratio ϕm in the air-fuel ratio feedback control.

As apparent from the above discussion, the air-fuel ratio detecting device of the third embodiment works to measure the response rates of the air-fuel ratio sensor 32 when the air-fuel ratio of a mixture has changed to the rich side and when it has changed to the lean side independently from each other to know the reactive characteristics thereof and reflect them in correcting the detected air-fuel ratio ϕsig. This results in improved accuracy of determining and controlling the air-fuel ratio of a mixture to the engine 10. Particularly, the response parameter α is so produced as to eliminate a difference between the reactive characteristics of the air-fuel ratio sensor 32 when the air-fuel ratio is changed to the rich and lean sides and used in correcting the detected air-fuel ratio ϕsig. The detected air-fuel ratio ϕsig is, therefore, corrected free from the deterioration of response characteristics of the air-fuel ratio sensor 32 when the air-fuel ratio is changed to the rich and lean sides.

The response data on the air-fuel ratio sensor 32 (i.e., the AFR change rate-to-AFR correction factor change rate ratios compR and compL) is, as described above, derived as functions of data on changes in the corrected air-fuel ratios ϕm upon changes in air-fuel ratio to the rich and lean sides (i.e., the corrected air-fuel ratio change rates ΔϕmR and ϕmL) and data on changes in the air-fuel ratio correction factor FAF (i.e., the correction factor change rates ΔFAFR and ΔFAFL). Specifically, the response data is obtained in terms of a correlation between the change in the corrected air-fuel ratio ϕm and the change in the air-fuel ratio correction factor FAF, thereby increasing the reliability of the response data to ensure the accuracy of detecting the failure of the air-fuel ratio sensor 32.

The detected air-fuel ratio ϕsig is allowed to be corrected under conditions where the air-fuel ratio sensor 32 does not failed completely and is activated sufficiently, thus avoiding erroneous correction of the detected air-fuel ratio ϕsig when it is impossible to know the response characteristics of the air-fuel ratio sensor 32.

The air-fuel ratio detecting device of this embodiment may alternatively be designed to correct the detected air-fuel ratio ϕsig using at least one of the AFR change rate-to-AFR correction factor change rate ratio compR and the AFR change rate-to-AFR correction factor change rate ratio compL, as derived in step 401 of FIG. 6, without use of the response parameter α, as determined so as to eliminate a difference between responses of the air-fuel ratio sensor 32 on the rich and lean sides. The determination of which of the AFR change rate-to-AFR correction factor change rate ratio compR and the AFR change rate-to-AFR correction factor change rate ratio compL is to be used may be made based on which of the response characteristics of the air-fuel ratio sensor 32 on the rich and lean sides is deteriorated.

The air-fuel ratio detecting device of this embodiment works to correct the detected air-fuel ratio ϕsig so as to eliminate a difference between the response characteristics of the air-fuel ratio sensor 32 on the rich and lean sides, but however, may correct it so as to establish such a difference intentionally. Specifically, the air-fuel ratio sensor 32 may originally have a difference between the response characteristics (i.e., the reactive characteristics) when the air-fuel ratio is changed to the rich side and to the lean side. Additionally, it may also be required to enhance the response characteristics of the air-fuel ratio sensor 32 only when the air-fuel ratio is being changed to either one of the rich and lean sides. In such a case, it is preferable that the detected air-fuel ratio ϕsig is corrected so as to keep or intentionally establish a difference between the response characteristics of the air-fuel ratio sensor 32 on the rich and lean sides.

Instead of the corrected air-fuel ratio change rates ΔϕmR and ΔϕmL and the air-fuel ratio correction factor change rates ΔFAFR and ΔFAFL, as used as the change data on the detected air-fuel ratios and the air-fuel ratio correction factors on the rich and lean sides of the air-fuel ratio, accelerations at which the corrected air-fuel ratio changes and the air-fuel ratio correction factor changes may be employed.

The detected air-fuel ratio Δsig is advanced in phase upon a change in air-fuel ratio to the lean side to derive the corrected air-fuel ratio ϕm, but however, it may alternatively be retarded in phase upon a change in air-fuel ratio to the rich side to determine the corrected air-fuel ratio ϕm. The correction of the detected air-fuel ratio ϕsig may alternatively be made by multiplying the detected air-fuel ratio ϕsig by a preselected gain.

The air-fuel ratio detecting device of this embodiment may alternatively be designed to change the air-fuel ratio intentionally in a cycle to detect the response characteristics of the air-fuel ratio sensor 32 and the deterioration thereof during the change in the air-fuel ratio. Such intentionally changing of the air-fuel ratio may be accomplished with the operation in FIG. 11 in the second embodiment or the air-fuel ratio dither control used for the purpose of activating the catalytic converter early at a cold start of the engine or improving the emission control efficiency (i.e. recovering the function) of the catalytic converter. For instance, the air-fuel ratio is changed intentionally from rich to lean and from lean to rich at several Hz. Resulting changes in the detected air-fuel ratio ϕsig and the air-fuel ratio correction factor FAF are monitored to correct the detected air-fuel ratio ϕsig. This enables the above change data to be derived sufficiently on the rich and lean sides of the air-fuel ratio, thus increasing the reliability of the correction of the air-fuel ratio, as detected by the air-fuel ratio sensor 32.

The correction of the detected air-fuel ratio ϕsig may also be achieved only using the change data on the detected air-fuel ratio ϕsig without use of the change data on the air-fuel ratio correction factor FAF. Particularly, in the case where the air-fuel ratio is changed intentionally, as described above, it is possible to know the amount of change in the air-fuel ratio in advance, thus allowing only the change data on the detected air-fuel ratio ϕsig to be used to correct the detected air-fuel ratio ϕsig effectively. It is also advisable in such a case that the detected air-fuel ratio ϕsig be corrected so as to eliminate a difference between the response characteristics of the air-fuel ratio sensor 32 on the rich and lean sides of the air-fuel ratio. As the change data on the detected air-fuel ratio ϕsig, the rate or acceleration of change in the detected air-fuel ratio ϕsig per unit time may be employed.

Figure 22:
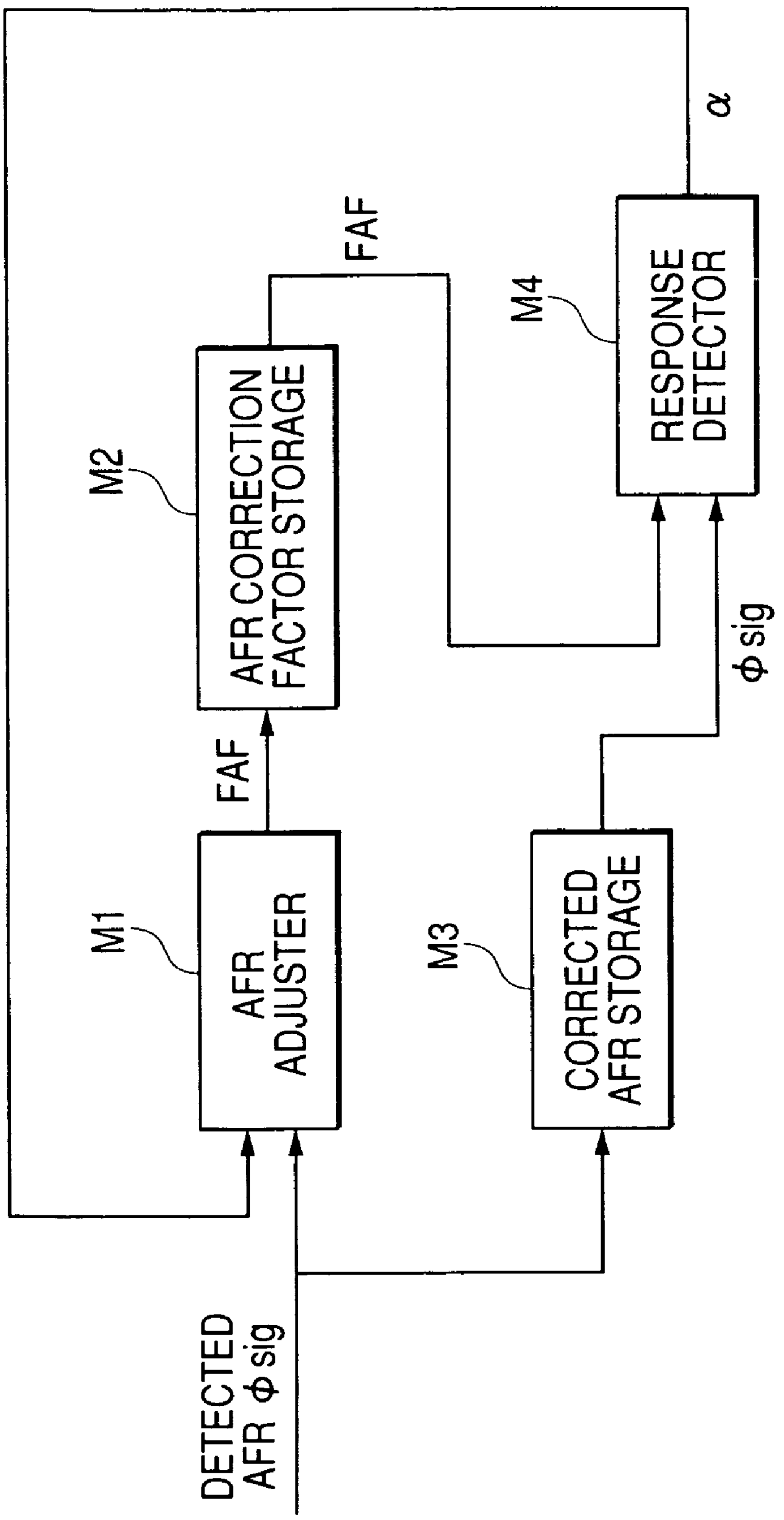
FIG. 22 is a block diagram which shows an air-fuel ratio detecting device according to the third embodiment of the invention.

FIG. 22 shows an air-fuel ratio controlling device constructed in the ECU 40 according to the fourth embodiment of the invention which is different in structure from that in the third embodiment, as illustrated in FIG. 20, in that it does not include the air-fuel ratio sensor signal processing circuit M5 and in operations, as described below.

Specifically, the air-fuel ratio controlling device is designed for the purpose of increasing the accuracy of controlling the air-fuel ratio of a mixture to the engine 10 and, as clearly shown in FIG. 22, consists of the air-fuel ratio adjusting circuit M1, the air-fuel ratio correction factor storage M2, and the corrected air-fuel ratio storage M3, the response detector M4.

The air-fuel ratio adjusting circuit M1 works to calculate the air-fuel ratio correction factor FAF as a function of a difference between the air-AF fuel ratio ϕsig, as detected by the air-fuel ratio sensor 32, and a target air-fuel ratio and correct the air-fuel ratio correction factor FAF using the response parameter α, as derived from the response detector M4. The air-fuel ratio correction factor storage M2 stores therein the value of the air-fuel ratio correction factor FAF, as determined one sampling cycle earlier, and that, as determined in the current sampling cycle. The corrected air-fuel ratio storage M3 works to store therein the value of the air-fuel ratio ϕsig, as determined one sampling cycle earlier, and that, as determined in the current sampling cycle. The response detector M4 works to calculates the response parameter α indicative of a response rate of the air-fuel ratio sensor 32 when the exhaust gas is changed to the rich or lean condition as functions of the air-fuel ratio correction factor FAF and the detected air-fuel ratio ϕsig.

In the following discussion, an excess fuel rate (i.e., the amount of fuel/the amount of air) will be referred to as representing the air-fuel ratio of a mixture to the engine 10. Note that an air excess ratio may alternatively be used.

Figure 23:
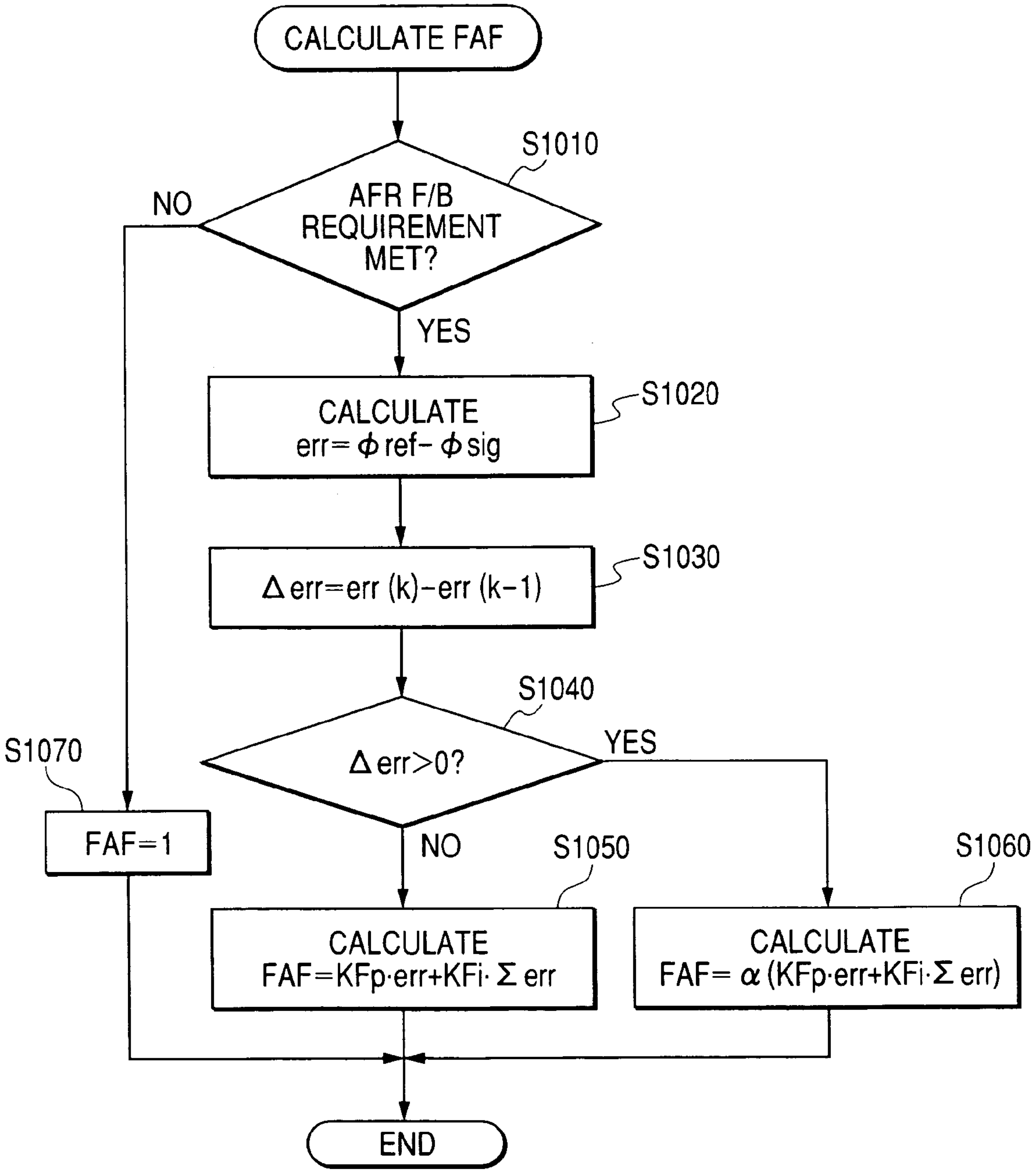
FIG. 23 is a flowchart of a program to determine a rate of change in air-fuel ratio correction factor.

FIG. 23 is a flowchart of logical steps or program to be executed in the air-fuel ratio adjusting circuit M1 to determine the air-fuel ratio correction factor FAF.

After entering the program, the routine proceeds to step 1010 wherein it is determined whether air-fuel ratio feedback control requirements are met or not.

The requirements include conditions where the temperature of a cooling water of the engine 10 (i.e., an output of the cooling water temperature sensor 33) is greater than a given value, where the engine 10 is not placed in high speed and high load states, and where the air-fuel ratio sensor 32 is placed in an activated state. If a YES answer is obtained in step 1010 meaning that the air-fuel ratio feedback control requirements are met, then the routine proceeds to step 1020 wherein an air-fuel ratio deviation err that is a difference between the detected air-fuel ratio ϕsig and the target air-fuel ratio ϕref (i.e., error=ϕref−ϕsig) is calculated. The routine proceeds to step 1030 wherein an AF deviation change Δerr that is a difference between the value of the air-fuel ratio deviation err, as derived one program cycle earlier, and that, as derived in this program cycle, is determined (i.e., Δerr=err (k)−err(k−1)).

The routine proceeds to step 1040 wherein it is determined whether the AF deviation change Δerr is greater than zero (0) or not. If a NO answer is obtained (i.e., Δerr≦0), then the routine proceeds to step 1050 wherein the air-fuel ratio correction factor FAF is determined by a known PI control technique according to the following equation.

$$FAF = KFp \cdot \mathrm{err} + KFi \cdot \Sigma \mathrm{err}$$

where KFp is a proportion gain, and KFi is an integral gain.

Alternatively, if a YES answer is obtained in step 1040, then the routine proceeds to step 1060 wherein the air-fuel ratio correction factor FAF is determined according to the following equation.

$$FAF = \alpha(KFp \cdot \mathrm{err} + KFi \cdot \Sigma \mathrm{err})$$

Specifically, the operation in step 1060 is equivalent to correcting the value of the air-fuel ratio correction factor FAF, as calculated in step 1050, using the response parameter α.

Note that the determination of the air-fuel ratio correction factor FAF may alternatively be made using another known technique. For instance, the air-fuel ratio correction factor FAF may be determined as a function of the value thereof, as determined in a previous program cycle or using a dynamic model representing the behavior of the engine 10.

If a NO answer is obtained in step 1010 meaning that the air-fuel ratio feedback control requirements are not met, then the routine proceeds to step 1070 wherein the air-fuel ratio correction factor FAF is set to one (1).

The response detector M4 works to determine the rate of change in the air-fuel ratio correction factor FAF, the rate of change in the detected air-fuel ratio ϕsig, and the response the response parameter α. The determination of the change rate of the air-fuel ratio correction factor FAF is identical with that, as already described with reference to FIG. 4, and explanation thereof in detail will be omitted here. The determinations of the change rate of the detected air-fuel ratio ϕsig and the response the response parameter α will be described below with reference to FIGS. 24 and 25.

Figure 24:
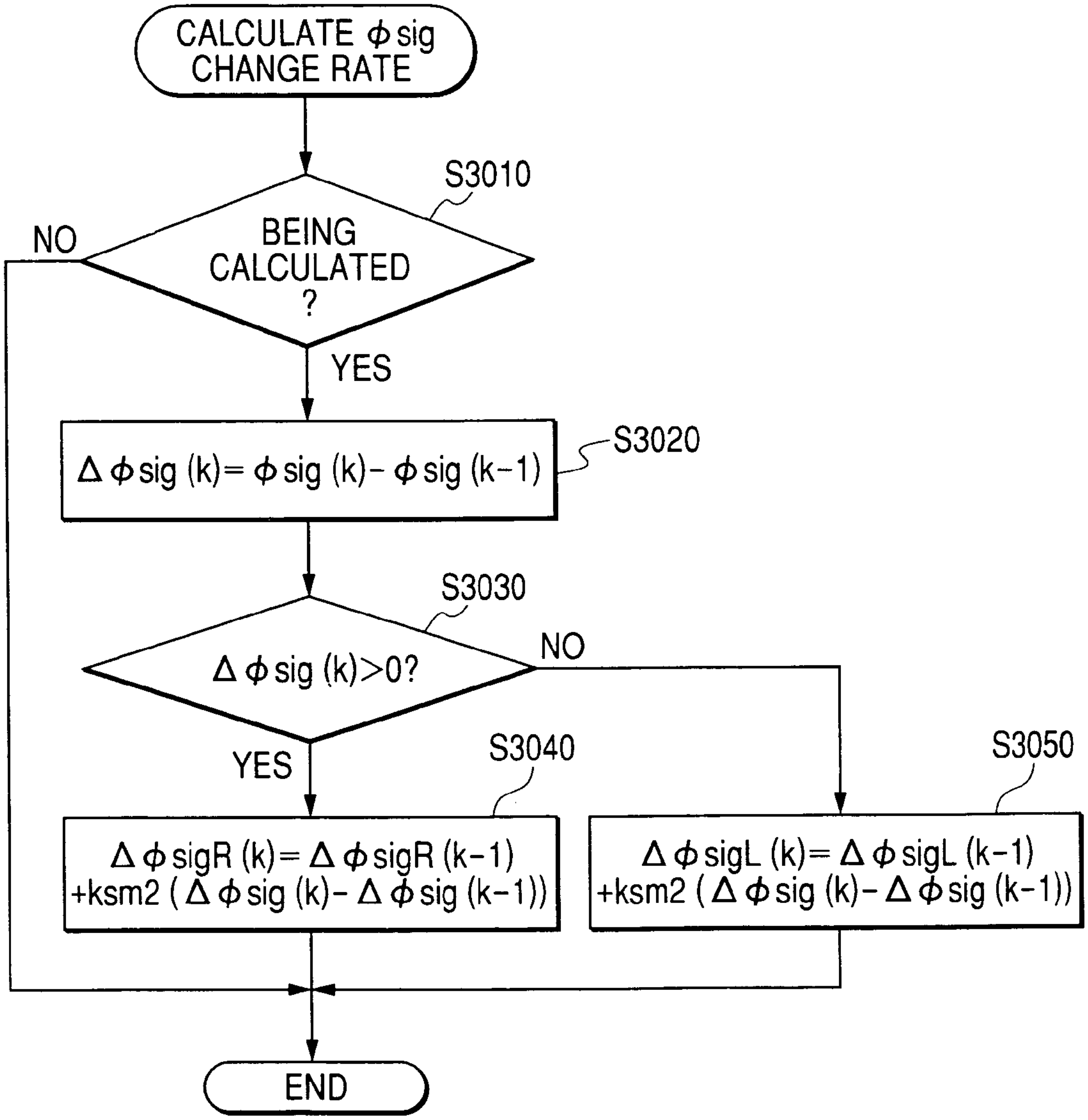
FIG. 24 is a flowchart of a program to determine a rate of change in air-fuel ratio.

In FIG. 24, it is determined in step 3010 whether the air-fuel ratio ϕsig is now being detected or not. If a YES answer is obtained meaning that the air-fuel ratio ϕsig is now being detected, then the routine proceeds to step 3020 wherein an air-fuel ratio change Δϕsig is determined that is the value ϕsig(k) of the air-fuel ratio ϕsig, as having been determined in this program cycle, minus the value ϕsig(k−1) of the air-fuel ratio ϕsig, as determined one program cycle earlier. The routine proceeds to step 3030 wherein it is determined whether the air-fuel ratio change Δϕsig is greater than zero (0) or not. The fact that the air-fuel ratio change Δϕsig is greater than zero (0) means that the excess fuel rate, as described above, has increased, so that the air-fuel ratio is changing to the rich side.

If a YES answer is obtained in step 3030 (Δϕsig>0), then the routine proceeds to step 3040 wherein an air-fuel ratio change rate ΔϕsigR that is a rate of change in the air-fuel ratio ϕsig upon the change of the air-fuel ratio to the rich side is determined according to the following equation:

$$\Delta\phi \mathrm{sig}R(k) = \Delta\phi \mathrm{sig}R(k-1) + ksm2(\Delta\phi \mathrm{sig}(k) - \Delta\phi \mathrm{sig}(k-1)$$

where ksm2 is a smoothing gain.

If a NO answer is obtained in step 3030, then the routine proceeds to step 3050 wherein an air-fuel ratio change rate ΔϕsigL that is a rate of change in the air-fuel ratio ϕsig upon the change of the air-fuel ratio to the lean side is determined according to the following equation:

$$\Delta\phi \mathrm{sig}L(k) = \Delta\phi \mathrm{sig}L(k-1) + ksm2(\Delta\phi \mathrm{sig}(k) - \Delta\phi \mathrm{sig}(k-1)$$

In the above manner, change data on the detected air-fuel ratio ϕsig when the air-fuel ratio is changed to the rich and lean side are derived as the air-fuel ratio change rates ΔϕsigR and ΔϕsigL.

Figure 25:
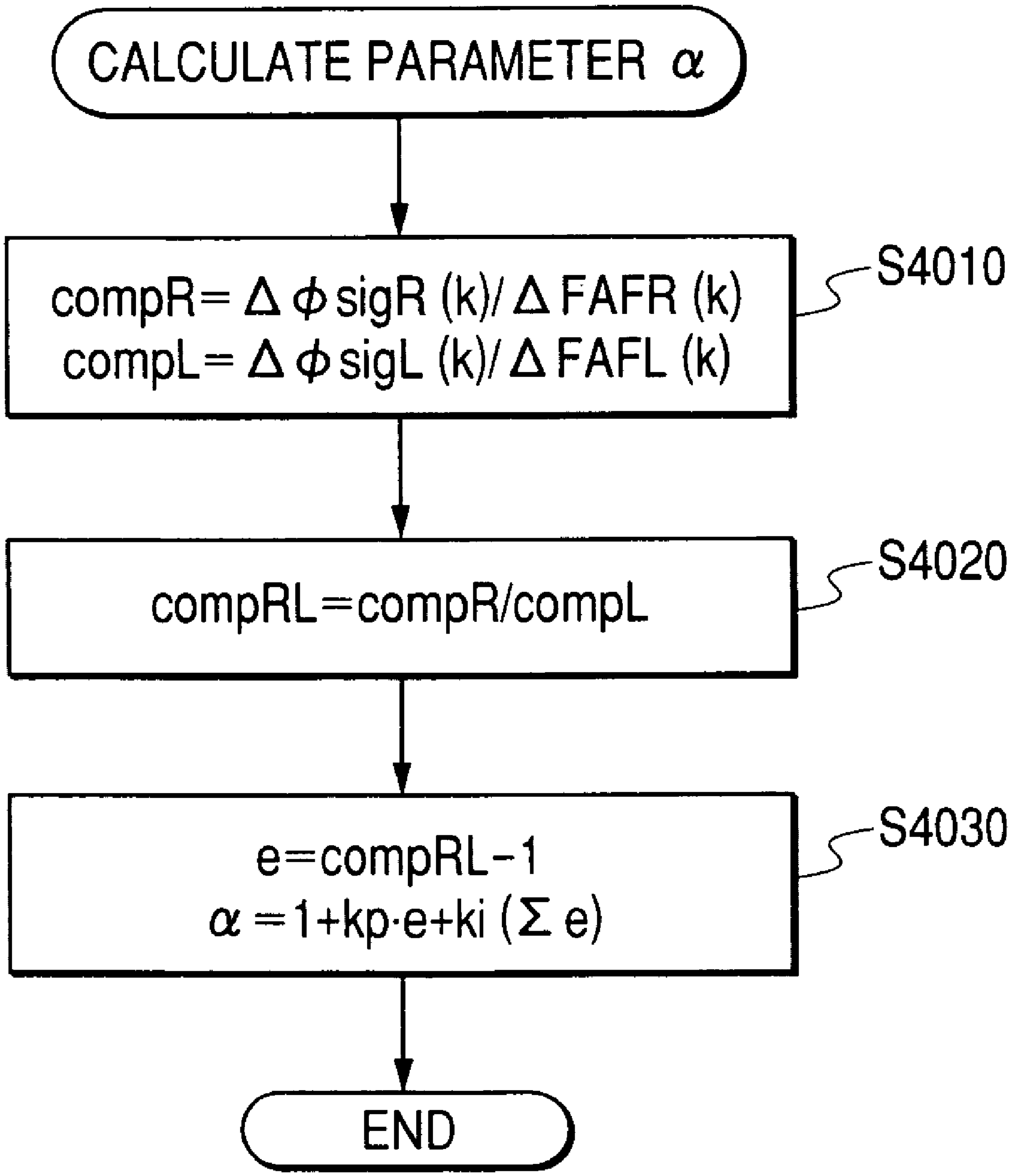
FIG. 25 is a flowchart of a program to determine a response parameter associated with response characteristics of an air-fuel ratio sensor.

The program of FIG. 25 will be described blow which is to calculate the response parameter α.

First, in step 4010, an AFR (air-fuel ratio) change rate-to-AFR correction factor change rate ratio compR is determined that is a ratio of the detected air-fuel ratio change rate ΔϕsigR to the correction factor change rate ΔFAFR upon the change in the air-fuel ratio to the rich side (i.e., ΔϕsigR(k)/ΔFAFR(k)). Additionally, an AFR change rate-to-AFR correction factor change rate ratio compL is determined that is a ratio of the air-fuel ratio change rate ΔϕsigL to the correction factor change rate ΔFAFL upon the change in the air-fuel ratio to the lean side (i.e., ΔϕmL(k)/ΔFAFL(K)).

The routine proceeds to step 4020 wherein a ratio compRL is determined that is a ratio of the AFR change rate-to-AFR correction factor change rate ratio compR to the AFR change rate-to-AFR correction factor change rate ratio compL, as derived in step 4010.

The routine proceeds to step 4030 wherein the response parameter α is determined using a PI compensator to bring the ratio compRL into agreement with one (1). Specifically, the response parameter α is calculated according to equations below.

$$e = \mathrm{comp}RL - 1$$

$$\alpha = 1 + kp \cdot e + ki(\Sigma e)$$

where kp is a proportional gain, ki is an integral gain.

In the above manners, as response data on the air-fuel ratio sensor 32, the AFR change rate-to-AFR correction factor change rate ratio compR when the air-fuel ratio is changed to the rich side the AFR change rate-to-AFR correction factor change rate ratio compL when the air-fuel ratio is changed to the lean side, and the response parameter α are derived. The response parameter α is used in step 1060 of FIG. 23 to determine the air-fuel ratio correction factor FAF.

Figure 26A:
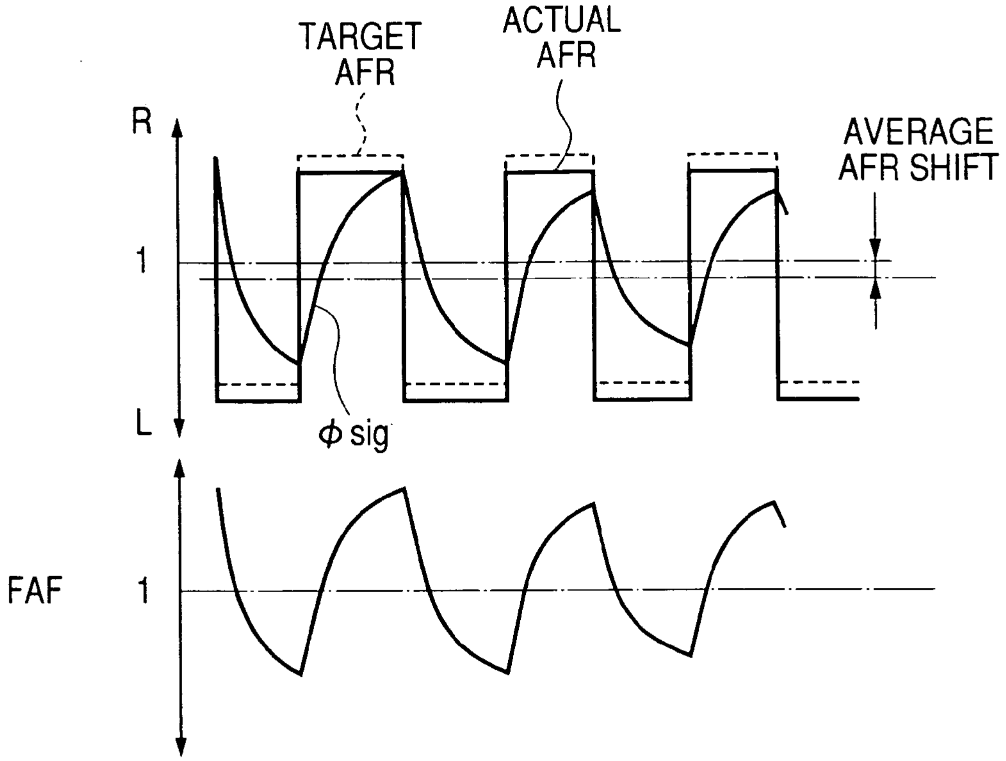
FIGS. 26(*a*) and 26(*b*) are time chart which show changes in air-fuel ratio and an air-fuel ratio correction factor.
Figure 26B:
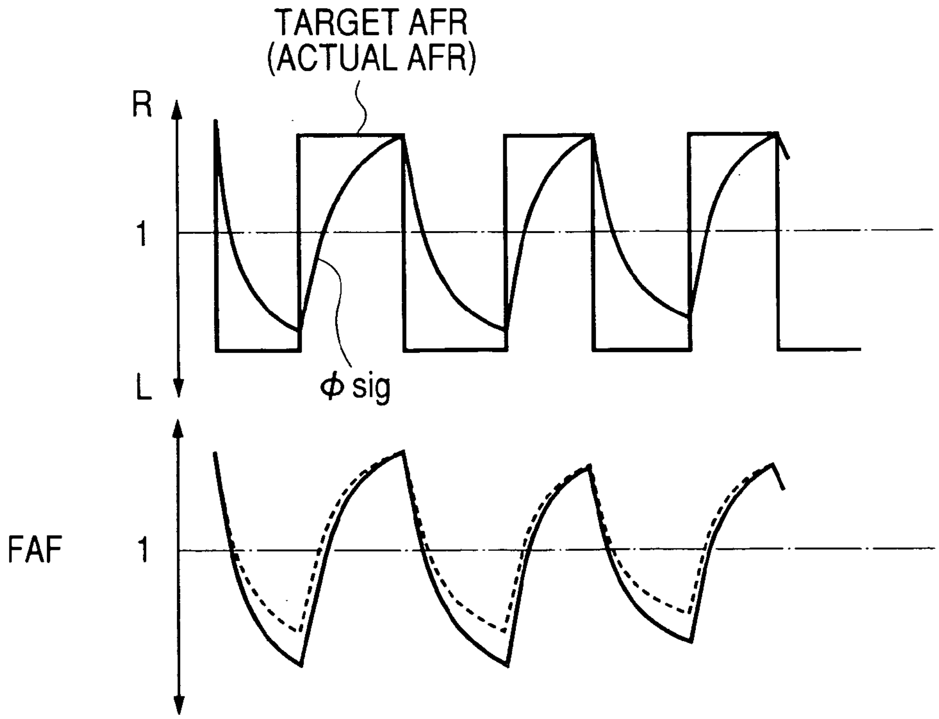

FIGS. 26(*a*) and 26(*b*) show changes in the detected air-fuel ratio ϕsig, the air-fuel ratio correction factor FAF, and an actual air-fuel ratio when the target air-fuel ratio is intentionally changed cyclically across the stoichiometric ratio, as expressed by one (1) on a vertical axis. Such intentionally changing of the air-fuel ratio is usually performed for the purpose of activating the catalytic converter early at a cold start of the engine or improving the emission control efficiency (i.e. recovering the function) of the catalytic converter after warm-up of the engine 10. In practice, the air-fuel ratio is changed intentionally from rich to lean and from lean to rich at several Hz.

In the example of FIG. 26(*a*), the detected air-fuel ratio ϕsig is shifted to the lean side as a whole, so that an average of the actual air-fuel ratio is offset from the stoichiometric ratio by an average AFR shift, as indicated by arrows. This would be because the air-fuel ratio sensor 32 is responsive to a change in the air-fuel ratio to the lean side more highly than to the rich side.

The air-fuel ratio controlling device of this embodiment works to, as shown in FIG. 26(*b*), correct or shift the air-fuel ratio correction factor FAF from a broken line to a solid line based on a difference in the response characteristics of the air-fuel ratio sensor 32 on the rich and lean sides of the air-fuel ratio, thereby eliminating the average AFR shift, as illustrated in FIG. 26(*a*).

As apparent from the above discussion, the air-fuel ratio controlling device of this embodiment works to measure the response characteristics of the air-fuel ratio sensor 32 when the air-fuel ratio of a mixture has changed to the rich side and when it has changed to the lean side independently from each other to know the reactive characteristics thereof and reflect them in correcting the air-fuel ratio correction factor FAF. This results in improved accuracy of controlling the air-fuel ratio of a mixture to the engine 10, thereby reducing the amount of harmful products in exhaust gas of the engine 10. Particularly, the response parameter α is so produced as to eliminate a difference between the reactive characteristics of the air-fuel ratio sensor 32 when the air-fuel ratio is changed to the rich and lean sides and used in correcting the air-fuel ratio correction factor FAF. The air-fuel ratio of a mixture to the engine 10 is, therefore, corrected free from the deterioration of response characteristics of the air-fuel ratio sensor 32 when the air-fuel ratio is changed to the rich and lean sides.

The response data on the air-fuel ratio sensor 32 (i.e., the AFR change rate-to-AFR correction factor change rate ratios compR and compL) is, as described above, derived as functions of the data on changes in the detected air-fuel ratios Δsig upon changes in air-fuel ratio to the rich and lean sides (i.e., the air-fuel ratio change rates ΔϕsigR and ΔϕsigL) and the data on changes in the air-fuel ratio correction factors FAF (i.e., the correction factor change rates ΔFAFR and ΔFAFL). Specifically, the response data of the air-fuel ratio sensor 32 is obtained in terms of a correlation between the change in the detected air-fuel ratio ϕsig and the change in the air-fuel ratio correction factor FAF, thereby increasing the reliability of the response data to correct the air-fuel ratio correction factor FAF.

When the engine control system is changing the air-fuel ratio intentionally from rich to lean and from lean to rich, the air-fuel ratio controlling device of this embodiment works to eliminate a difference between the average of the air-fuel ratio and the target air-fuel ratio, thereby bringing the center across which the air-fuel ratio changes cyclically into agreement with the target air-fuel ratio such as the stoichiometric value.

The air-fuel ratio detecting device of this embodiment may alternatively be designed to correct the air-fuel ratio correction factor FAF using at least one of the AFR change rate-to-AFR correction factor change rate ratio compR and the AFR change rate-to-AFR correction factor change rate ratio compL without use of the response parameter α, as determined so as to eliminate a difference between responses of the air-fuel ratio sensor 32 on the rich and lean sides. The determination of which of the AFR change rate-to-AFR correction factor change rate ratio compR and the AFR change rate-to-AFR correction factor change rate ratio compL is to be used may be made based on which of the response characteristics of the air-fuel ratio sensor 32 on the rich and lean sides is deteriorated.

Instead of the detected air-fuel ratio change rates ΔϕsigR and ΔϕsigL and the air-fuel ratio correction factor change rates ΔFAFR and ΔFAFL, as used as the change data on the detected air-fuel ratios and the air-fuel ratio correction factors on the rich and lean sides of the air-fuel ratio, accelerations at which the corrected air-fuel ratio changes and the air-fuel ratio correction factor changes may be employed.

The air-fuel ratio controlling device of this embodiment works to correct the air-fuel ratio correction factor FAF as a function of the response parameter α only when it is determined in step 1040 of FIG. 23 that the AF deviation change Δerr is greater than zero (0), but however, may alternatively perform such a correction when the average of the detected air-fuel ratio ϕsig during cyclic changing of the air-fuel ratio is far away from a target average by a given value.

Instead of or in addition to the air-fuel ratio correction factor FAF, the target air-fuel ratio and/or the air-fuel ratio feedback control gain may also be corrected in the manner, as described above.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An air-fuel ratio sensor failure detecting apparatus designed to detect a predetermined failure of an air-fuel ratio sensor installed in an exhaust line of an internal combustion engine, comprising:

a correction factor determining circuit working to determine an air-fuel ratio correction factor to bring an air-fuel ratio, as detected through the air-fuel ratio sensor, into agreement with a target value;

an air-fuel ratio change data determining circuit working to determine air-fuel ratio change data associated with changes in the detected air-fuel ratio to a rich and a lean side, respectively;

an air-fuel ratio correction factor change data determining circuit working to determine air-fuel ratio correction factor change data associated with changes in the air-fuel ratio correction factor upon changes in the air-fuel ratio to the rich and lean sides, respectively;

a response characteristic determining circuit working to determine response characteristics of the air-fuel ratio sensor upon the changes in the air-fuel ratio to the rich and lean sides, respectively, as functions of the air-fuel ratio change data and the air-fuel ratio correction factor change data; and a sensor failure detecting circuit working to detect the predetermined failure of the air-fuel ratio sensor based on the response characteristics, as determined by said response characteristic determining circuit.

2. An air-fuel ratio sensor failure detecting apparatus as set forth in claim 1, wherein said response characteristic determining circuit determines the response characteristics of the air-fuel ratio sensor upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side, and wherein the sensor failure detecting circuit detects the predetermined failure of the air-fuel ratio sensor based on the rich side and lean side ratios, as determined by said response characteristic.

3. An air-fuel ratio sensor failure detecting apparatus as set forth in claim 2, wherein said sensor failure detecting circuit compares the rich side ratio with a given rich side reference value and the lean side ratio with a given lean side reference value to determine whether the predetermined failure of the air-fuel ratio sensor has occurred or not.

4. An air-fuel ratio sensor failure detecting apparatus as set forth in claim 1, wherein said sensor failure detecting circuit determines that said air-fuel ratio sensor is failing in the response characteristic upon the change in the air-fuel ratio to the rich side when the change in the detected air-fuel ratio to the rich side is greater than the change in the air-fuel ratio correction factor upon the change in the air-fuel ratio to the rich side and that said air-fuel ratio sensor is failing in the response characteristic upon the change in the air-fuel ratio to the lean side when the change in the detected air-fuel ratio to the lean side is greater than the change in the air-fuel ratio correction factor upon the change in the air-fuel ratio to the lean side.

5. An air-fuel ratio sensor failure detecting apparatus as set forth in claim 1, wherein the air-fuel ratio change data are rates or accelerations of the changes in the detected air-fuel ratio to the rich and lean sides, and wherein the air-fuel ratio correction change data are rates or accelerations of the changes in the air-fuel ratio correction factor to the rich and lean sides.

6. An air-fuel ratio sensor failure detecting apparatus as set forth in claim 1, further comprising a data determination permission circuit which works to selectively permit the air-fuel ratio change data and the air-fuel ratio correction factor change data to be determined based on behavior of the changes in the air-fuel ratio correction factor.

7. An air-fuel ratio sensor failure detecting apparatus as set forth in claim 6, said data determination permission circuit permits the air-fuel ratio change data and the air-fuel ratio correction factor change data to be determined only when an amount of the change in the air-fuel ratio correction factor within a given period of time upon the change in the air-fuel ratio to one of the rich and lean sides is greater than a given value.

8. An air-fuel ratio sensor failure detecting apparatus as set forth in claim 6, wherein said data determination permission circuit works to permit the air-fuel ratio change data to be determined a predetermined period of time after the air-fuel ratio correction factor change data starts to be determined.

9. An air-fuel ratio sensor failure detecting apparatus as set forth in claim 8, wherein said predetermined period of time is a lag time between a change in amount of fuel to the engine and a resulting change in a gas atmosphere around the air-fuel ratio sensor.

10. An air-fuel ratio sensor failure detecting apparatus as set forth in claim 6, wherein said data determination permission circuit permits the air-fuel ratio change data to be determined within a given period of time.

11. An air-fuel ratio sensor failure detecting apparatus as set forth in claim 6, wherein said data determination permission circuit prohibits the air-fuel ratio change data from being determined when an amount of the change in the air-fuel ratio correction factor upon the change in the air-fuel ratio to the rich side exceeds a given value, and the detected air-fuel ratio changes to the lean side or when an amount of the change in the air-fuel ratio correction factor upon the change in the air-fuel ratio to the lean side exceeds a given value, and the detected air-fuel ratio changes to the rich side.

12. An air-fuel ratio sensor failure detecting apparatus as set forth in claim 1, further comprising a response parameter determining circuit which works to determine a response parameter so as to eliminate a difference between the response characteristics of the air-fuel ratio sensor upon the changes in the air-fuel ratio to the rich side and the lean side, and wherein said sensor failure detecting circuit detects the predetermined failure of the air-fuel ratio sensor based on the response parameter.

13. An air-fuel ratio sensor failure detecting apparatus as set forth in claim 1, further comprising an air-fuel ratio changing circuit working to intentionally change an air-fuel ratio of a mixture to the engine from the rich side to the lean side and from the rich side to the lean side, and wherein said sensor failure detecting circuit detects the predetermined failure of the air-fuel ratio based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

14. An air-fuel ratio sensor failure detecting apparatus as set forth in claim 13, wherein said air-fuel ratio changing circuit determines at least one of a cycle and an amplitude of the intentional change in the air-fuel ratio as a function of an instantaneous operating condition of the engine.

15. An air-fuel ratio sensor failure detecting apparatus as set forth in claim 14, wherein said air-fuel ratio changing circuit increases the at least one of the cycle and the amplitude of the intentional change in the air-fuel ratio within a low speed and a low load range of the engine and decreases the at least one of the cycle and the amplitude of the intentional change in the air-fuel ratio within a high speed and a high load range of the engine.

16. An air-fuel ratio sensor failure detecting apparatus as set forth in claim 13, wherein said air-fuel ratio changing circuit oscillates a target air-fuel ratio from the rich side to the lean side and from the lean side to the rich side and switches the target air-fuel ratio between a rich side target air-fuel ratio and a lean side target air-fuel ratio each time the detected air-fuel ratio reaches the target air-fuel ratio.

17. A response characteristic detecting apparatus for an air-fuel ratio sensor installed in an exhaust line of an internal combustion engine, comprising:

a correction factor determining circuit working to determine an air fuel ratio correction factor to bring an air-fuel ratio of a mixture to the engine, as detected through the air-fuel ratio sensor, into agreement with a target value;

an air-fuel ratio change data determining circuit working to determine air-fuel ratio change data associated with changes in the detected air-fuel ratio to a rich and a lean side, respectively; an air-fuel ratio correction factor change data determining circuit working to determine air-fuel ratio correction factor change data associated with changes in the air-fuel ratio correction factor upon changes in the air-fuel ratio to the rich and lean sides, respectively;

a response characteristic determining circuit working to determine response characteristics of the air-fuel ratio sensor upon the changes in the air-fuel ratio to the rich and lean sides, respectively, based on the air-fuel ratio change data and the air-fuel ratio correction factor change data; and a data determination permission circuit which works to selectively permit the air-fuel ratio change data and the air-fuel ratio correction factor change data to be determined based on behavior of the changes in the air-fuel ratio correction factor.

18. A response characteristic detecting apparatus as set forth in claim 17, said data determination permission circuit permits the air-fuel ratio change data and the air-fuel ratio correction factor change data to be determined only when an amount of the change in the air-fuel ratio correction factor within a given period of time upon the change in the air-fuel ratio to one of the rich and lean sides is greater than a given value.

19. A response characteristic detecting apparatus as set forth in claim 17, wherein said data determination permission circuit works to permit the air-fuel ratio change data to be determined a predetermined period of time after the air-fuel ratio correction factor change data starts to be determined.

20. A response characteristic detecting apparatus as set forth in claim 19, wherein said predetermined period of time is a lag time between a change in amount of fuel to the engine and a resulting change in a gas atmosphere around the air-fuel ratio sensor.

21. A response characteristic detecting apparatus as set forth in claim 17, wherein said data determination permission circuit permits the air-fuel ratio change data to be determined within given period of time.

22. A response characteristic detecting apparatus as set forth in claim 17, wherein said data determination permission circuit prohibits the air-fuel ratio change data from being determined when an amount of the change in the air-fuel ratio correction factor upon the change in the air-fuel ratio to the rich side exceeds a given value, and the detected air-fuel ratio changes to the lean side or when an amount of the change in the air-fuel ratio correction factor upon the change in the air-fuel ratio to the lean side exceeds a given value, and the detected air-fuel ratio changes to the rich side.

23. A response characteristic detecting apparatus as set forth in claim 17, further comprising an air-fuel ratio changing circuit working to intentionally change an air-fuel ratio of a mixture to the engine from the rich side to the lean side and from the rich side to the lean side, and wherein said response characteristic determining circuit determines the response characteristics based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

24. A response characteristic detecting apparatus as set forth in claim 23, wherein said air-fuel ratio changing circuit determines at least one of a cycle and an amplitude of the intentional change in the air-fuel ratio as a function of an instantaneous operating condition of the engine.

25. A response characteristic detecting apparatus as set forth in claim 24, wherein said air-fuel ratio changing circuit increases the at least one of the cycle and the amplitude of the intentional change in the air-fuel ratio within a low speed and a low load range of the engine and decreases the at least one of the cycle and the amplitude of the intentional change in the air-fuel ratio within a high speed and a high load range of the engine.

26. A response characteristic detecting apparatus as set forth in claim 23, wherein said air-fuel ratio changing circuit oscillates a target air-fuel ratio from the rich side to the lean side and from the lean side to the rich side and switches the target air-fuel ratio between a rich side target air-fuel ratio and a lean side target air-fuel ratio each time the detected air-fuel ratio reaches the target air-fuel ratio.

27. An air-fuel ratio detecting apparatus for an internal combustion engine comprising:

an air-fuel ratio sensor installed in an exhaust line of an internal combustion engine to produce an output that is a function of an air-fuel ratio of a mixture to the engine:

a correction factor determining circuit working to determine an air-fuel ratio correction factor to bring the air-fuel ratio, as detected through said air-fuel ratio sensor, into agreement with a target value;

an air-fuel ratio change data determining circuit working to determine air-fuel ratio change data associated with changes in the detected air-fuel ratio to a rich and a lean side, respectively;

an air-fuel ratio correction factor change data determining circuit working to determine air-fuel ratio correction factor change data associated with changes in the air-fuel ratio correction factor upon changes in the air-fuel ratio to the rich and lean sides, respectively;

a response characteristic determining circuit working to determine response characteristics of said air-fuel ratio sensor upon the changes in the air-fuel ratio to the rich and lean sides, respectively, as functions of the air-fuel ratio change data and the air-fuel ratio correction factor change data; and an air-fuel ratio correcting circuit working to correct the detected air-fuel ratio using the response characteristics determined by said response characteristic determining circuit.

28. An air-fuel ratio detecting apparatus as set forth in claim 27, wherein said air-fuel ratio correcting circuit corrects the detected air-fuel ratio so as to eliminate a difference between the response characteristics determined by said response characteristic determining circuit.

29. An air-fuel ratio detecting apparatus as set forth in claim 28, further comprising a response parameter determining circuit which works to determine a response parameter so as to eliminate the difference between the response characteristics of the air-fuel ratio sensor upon the changes in the air-fuel ratio to the rich side and the lean side, and wherein said air-fuel ratio correcting circuit corrects the detected air-fuel ratio using the response parameter.

30. An air-fuel ratio detecting apparatus as set forth in claim 27, wherein said response characteristic determining circuit determines the response characteristics of the air-fuel ratio sensor upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side.

31. An air-fuel ratio detecting apparatus as set forth in claim 27, wherein the air-fuel ratio change data are rates or accelerations of the changes in the detected air-fuel ratio to the rich and lean sides, and wherein the air-fuel ratio correction change data are rates or accelerations of the changes in the air-fuel ratio correction factor to the rich and lean sides.

32. An air-fuel ratio detecting apparatus for an internal combustion engine comprising:

an air-fuel ratio sensor installed in an exhaust line of an 5 internal combustion engine to produce an output that is a function of an air-fuel ratio of a mixture to the engine:

an air-fuel ratio change data determining circuit working to determine air-fuel ratio change data associated with changes in the detected air-fuel ratio to a rich and a lean side, respectively; and an air-fuel ratio correcting circuit working to correct the detected air-fuel ratio based on the air-fuel ratio change data associated with the changes in the detected air-fuel ratio to the rich and lean sides.

33. An air-fuel ratio detecting apparatus as set forth in claim 32, wherein said air-fuel ratio correcting circuit corrects the detected air-fuel ratio so as to eliminate a difference between response characteristics of said air-fuel ratio sensor upon the changes in the air-fuel ratio to the rich and lean sides.

34. An air-fuel ratio detecting apparatus as set forth in claim 33, wherein the air-fuel ratio change data are rates or accelerations of the changes in the detected air-fuel ratio to the rich and lean sides.

35. An air-fuel ratio detecting apparatus as set forth in claim 32, wherein said air-fuel ratio correcting circuit corrects the detected air-fuel ratio so as to establish a given difference between response characteristics of said air-fuel ratio sensor upon the changes in the air-fuel ratio to the rich and lean sides.

36. An air-fuel ratio detecting apparatus as set forth in claim 32, wherein said air-fuel ratio correcting circuit advances or retards a phase of the detected air-fuel ratio to correct the detected air-fuel ratio.

37. An air-fuel ratio detecting apparatus as set forth in claim 32, wherein said air-fuel ratio correcting circuit corrects the detected air-fuel ratio when given requirements at least related to a condition of said air-fuel ratio sensor are met.

38. An air-fuel ratio detecting apparatus as set forth in claim 32, further comprising an air-fuel ratio changing circuit working to intentionally change the air-fuel ratio of the mixture to the engine from the rich side to the lean side and from the rich side to the lean side, and wherein said air-fuel ratio correcting circuit corrects the detected air-fuel ratio based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing circuit.

39. An air-fuel ratio controlling apparatus comprising:

an air-fuel ratio sensor installed in an exhaust line of an internal combustion engine to produce an output that is a function of an air-fuel ratio of a mixture to the engine:

a correction factor determining circuit working to determine an air-fuel ratio correction factor to bring an air-fuel ratio, as detected through the air-fuel ratio sensor, into agreement with a target air-fuel ratio value;

an air-fuel ratio change data determining circuit working to determine air-fuel ratio change data associated with changes in the detected air-fuel ratio to a rich and a lean side, respectively;

an air-fuel ratio correction factor change data determining circuit working to determine air-fuel ratio correction factor change data associated with changes in the air-fuel ratio correction factor upon changes in the air-fuel ratio to the rich and lean sides, respectively;

a response characteristic determining circuit working to determine response characteristics of the air-fuel ratio sensor upon the changes in the air-fuel ratio to the rich and lean sides, respectively, as functions of the air-fuel ratio change data and the air-fuel ratio correction factor change data; and a control parameter correcting circuit working to correct a control parameter using the response characteristics of the air-fuel ratio sensor, the control parameter being used in controlling the air-fuel ratio of the mixture to the engine.

40. An air-fuel ratio controlling apparatus as set forth in claim 39, wherein said control parameter correcting circuit corrects the control parameter as a function of a difference between the response 5 characteristics of the air-fuel ratio sensor upon the changes in the air-fuel ratio to the rich and lean sides.

41. An air-fuel ratio controlling apparatus as set forth in claim 39, further comprising a parameter determining circuit which works to determine a response parameter to bring the response characteristics of the air-fuel ratio sensor upon the changes in the air-fuel ratio to the rich and lean sides into agreement with each other, and wherein said control parameter correcting circuit corrects the control parameter using the response parameter.

42. An air-fuel ratio controlling apparatus as set forth in claim 39, wherein said control parameter correcting circuit corrects the air-fuel ratio correction factor used as the control parameter.

43. An air-fuel ratio controlling apparatus as set forth in claim 39, wherein said control parameter correcting circuit corrects the target air-fuel ratio value used as the control parameter.

44. An air-fuel ratio controlling apparatus as set forth in claim 39, wherein said control parameter correcting circuit corrects a control gain used as the control parameter.

45. An air-fuel ratio controlling apparatus as set forth in claim 39, wherein said response characteristic determining circuit determines the response characteristics of the air-fuel ratio sensor 5 upon the changes in the air-fuel ratio to the rich and lean sides, respectively, as a function of a rich side ratio that is a ratio of the air-fuel ratio change data to the air-fuel ratio correction factor change data upon the change in the air-fuel ratio to the rich side and a lean side ratio that is a ratio of the air-fuel ratio change data to the air-fuel ratio correction factor change data upon the change in the air-fuel ratio to the lean side.

46. An air-fuel ratio controlling apparatus as set forth in claim 39, wherein said control parameter correcting circuit corrects the control parameter when a deviation of the air-fuel ratio from the target air-fuel ratio increases.

47. An air-fuel ratio controlling apparatus as set forth in claim 39, wherein the air-fuel ratio change data are rates or accelerations of the changes in the detected air-fuel ratio to the rich and lean sides, and wherein the air-fuel ratio correction change data are rates or accelerations of the changes in the air-fuel ratio correction factor to the rich and lean sides.

48. An air-fuel ratio controlling apparatus as set forth in claim 39, further comprising an air-fuel ratio changing circuit working to intentionally change the air-fuel ratio of the mixture to the engine from the rich side to the lean side and from the rich side to the lean side, and wherein said control parameter correcting circuit corrects the control parameter based on one of the air-fuel ratio change data when the detected air-fuel ratio changes to the rich side with an intentional change in the air-fuel ratio provided by the air-fuel ratio changing circuit and the air-fuel ratio change data when the detected air-fuel ratio changes to the lean side with the intentional change in the air-fuel ratio provided by the air-fuel ratio changing 10 circuit.

49. An air-fuel ratio controlling apparatus as set forth in claim 48, further comprising an average determining circuit working to determine an average of the detected air-fuel ratio, and wherein said control parameter correcting circuit corrects the control parameter when the average of the detected air-fuel ratio lies far from a target average value by a predetermined amount.

* * * * *